United States Patent
Katayama et al.

(10) Patent No.: US 7,668,626 B2
(45) Date of Patent: Feb. 23, 2010

(54) IMAGE DISPLAYING METHOD WITH FLUCTUATION CORRECTION AND REMOTE CONTROL SYSTEM FOR MOVING UNIT USING THE METHOD

(75) Inventors: Yuji Katayama, Tokyo (JP); Yutaka Kidawara, Tokyo (JP); Mina Aoki, Tokyo (JP); Kenji Tanaka, Tokyo (JP)

(73) Assignees: National Institute of Information and Communications Technology, Incorporated Administrative Agency (JP); Sanritz Automation Co., Ltd. (JP)

( * ) Notice: Subject to any disclaimer, the term of this patent is extended or adjusted under 35 U.S.C. 154(b) by 531 days.

(21) Appl. No.: 11/464,840

(22) Filed: Aug. 16, 2006

(65) Prior Publication Data

US 2008/0046940 A1     Feb. 21, 2008

(51) Int. Cl.
    *G06F 17/00*      (2006.01)
(52) U.S. Cl. ......................................... 701/1
(58) Field of Classification Search ...................... 701/1; 345/440
See application file for complete search history.

(56) References Cited

U.S. PATENT DOCUMENTS 6,195,103 B1 *    2/2001    Stewart ...................... 345/440

FOREIGN PATENT DOCUMENTS

| JP | 07-137997 | 5/1995 |
|---|---|---|
| JP | 2002254360 | 9/2002 |
| JP | 2006-074441 | 3/2006 |

\* cited by examiner

*Primary Examiner*—Yonel Beaulieu
(74) *Attorney, Agent, or Firm*—Schmeiser, Olsen & Watts

(57) ABSTRACT

An operation machine displays a received image on a monitor to enable an operator to remotely control a moving unit such as a model car and robotic arms through the image provided through a network by a camera on the unit and displayed on the monitor. Plotting of the received image on the monitor is conducted at predetermined intervals in plotting timing. The plotted image becomes a predicted image subjected to a time delay process. The moving unit carrying the camera is disposed in a remote area, and connected to a personal computer through the Internet to transmit motion pictures to the computer. At this time, a fluctuation correction is made to data of the motion pictures to provide a method of displaying a natural image. The method is employed in a moving unit's remote control system enabling an operator to enjoy a precise remote control of the unit.

8 Claims, 22 Drawing Sheets

Fig. 19

(1) SYSTEM CONNECTION INFORMATION

| AUTHENTICATION CODE | SYSTEM TIME |
|---|---|

(2) CONNECTION RESPONSE INFRORMATION

| RESPONSE CODE |
|---|

(3) IMAGE INFORMATION

| TIME STAMP | IMAGE DATA |
|---|---|

(4) SENSOR INFORMATION

| MOVING UNIT SPEED | BATTERY VOLTAGE | TIME FOR COMMUNICATION |
|---|---|---|

(5) CONTROL INFORMATION

| DRIVE MOTOR VALUE | STEERING POSITION | TIME FOR TRANSMISSION | DELAY TIME IN COMMUNICATION |
|---|---|---|---|

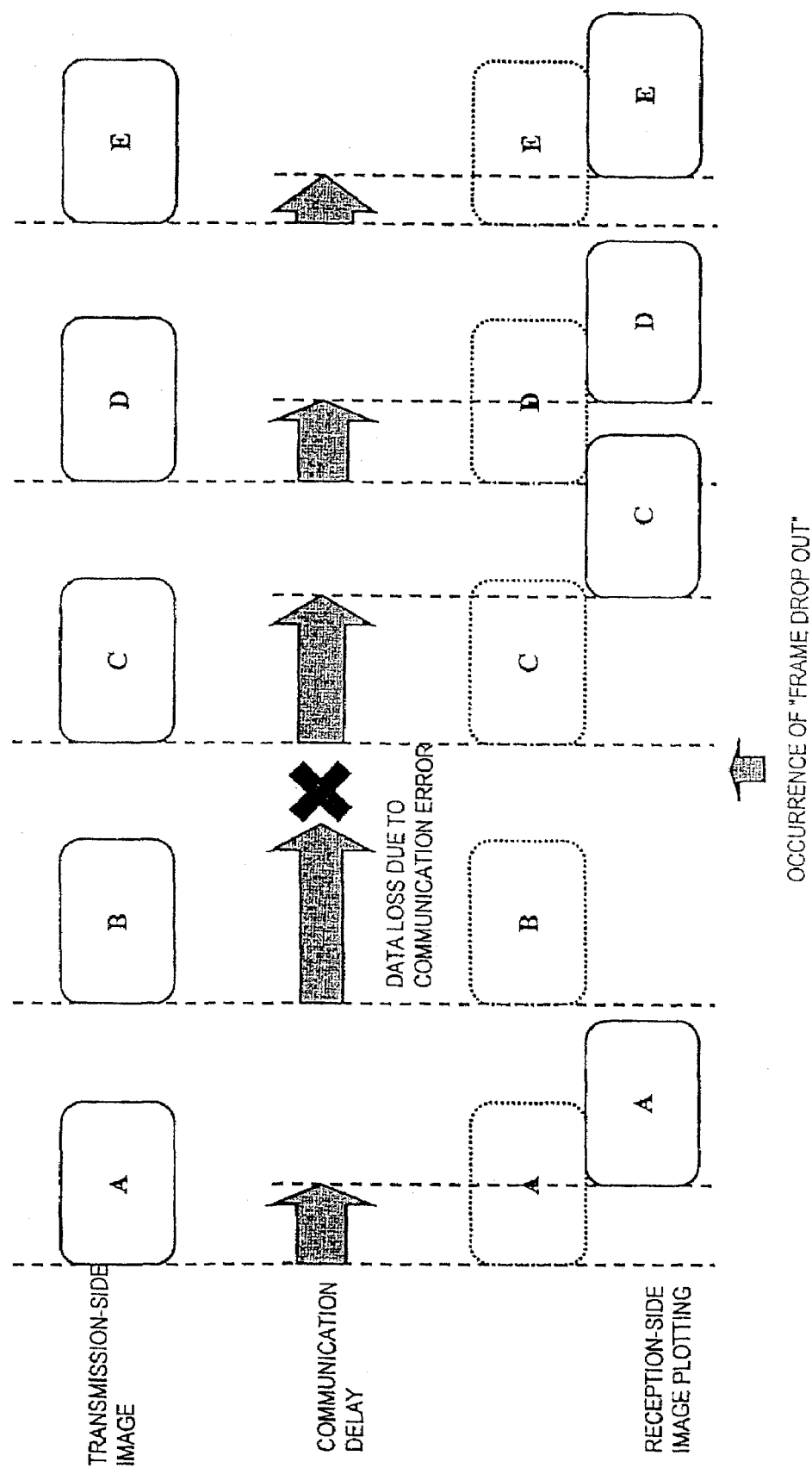

IMAGE DISPLAYING METHOD WITH FLUCTUATION CORRECTION AND REMOTE CONTROL SYSTEM FOR MOVING UNIT USING THE METHOD

BACKGROUND OF THE INVENTION

1. Field of the Invention

The present invention relates to an image displaying method, which makes a correction to fluctuations, and relates to a remote control system for a moving unit, wherein the system uses the method. More particularly, the present invention relates to the remote control system, which functions to remotely control a moving unit such as model cars, model planes, model ships, robots, robotic arms in industrial robots and the like, in motion and in speed of such a moving unit through a control operation of an operation machine, the control operation being conducted by an operator of the operation machine.

2. Description of the Related Art

There have been proposed two devices, one of which is a remote controlled camera device and the other a remotely monitoring system device. Each of these devices is capable of changing its camera's shooting area and the like through a remote control of the device. Japanese Patent application Laid-Open No. Hei 6-38087, for example, has proposed one of the remote controlled camera devices, which one is capable of making a correction to an excessive control amount appearing in controlling its monitoring camera section, wherein a delay in data transmission and a delay in signal processing result in such an excessive control amount. On the other hand, as for the other device, that is, the remotely monitoring system device, Japanese Patent application Laid-Open No. 2002-185956, for example, has proposed one of the remotely monitoring system devices, in which one an image displayed in a receiving side of the system device at a time when the camera is in motion is shifted and displayed so as to approach its real-time image supposed to appear in a current shooting area of the camera. This makes it possible to provide the monitoring system device, which is remotely controlled through the camera in a manner such that a displayed range of the image in the receiving side of the system device is processed so as to: have the displayed image have every appearance of being a real-time image supposed to appear in the current shooting area; and, provide the displayed image as if it were free from any time delay in displaying it in the receiving side of the system device.

These conventional techniques mentioned above are however based on the premise that motion pictures are transmitted through a wire circuit. Therefore, it is possible for these techniques to transmit the motion pictures free from any feeling of disorder by making a correction to a fixed time delay caused in the wire circuit. On the other hand, in case that the motion pictures are transmitted through a wireless circuit such as the Internet and a wireless LAN, it is impossible to obtain a constant communication speed. This leads to a fluctuation in arrival time of data of the motion pictures.

In other words, a variation in communication delay leads to a variation in image plotting timing. This leads often to a communication error, which leads to an occasional loss of data. As a result, the motion pictures suffering from a feeling of disorder are displayed (See FIGS. 20, 21 and 22) in the receiving side of the device.

As is clear from the above reasons, in case that an operator operates a moving unit such as a model car and the like carrying a camera such as one described in the above by monitoring an image shot by the camera and displayed on a monitor of a personal computer and the like, such a fluctuation described above disturbs the motion pictures so as to impair a smooth and continuous stream of the motion pictures. Namely, such a fluctuation leads to the discontinuity in data stream of the motion pictures. Due to the presence of this discontinuity in the data stream of the motion pictures, it is impossible for the operator to forecast the moving unit's motion and therefore impossible to assume precise control of the moving unit. This impairs the controllability of the moving unit.

As countermeasures against the above problems, a conventional method for suppressing a fluctuation accumulates data of the motion pictures, which data is capable of covering a variation range of the fluctuation and accumulated in the receiving side in communication. However, such countermeasures mentioned above suffers from occurrence of a time delay in motion pictures, wherein such a time delay corresponds to an amount of the data of the motion pictures thus accumulated.

SUMMARY OF THE INVENTION

Under such circumstances, the present invention was made to solve the problems inherent in the prior art. Consequently, it is an object of the present invention to provide: an image displaying method, which makes a correction to fluctuations; and, a remote control system for a moving unit such as a model car, robotic arms and the like, wherein the system uses the method.

In accordance with the first aspect of the present invention, the above object of the present invention is accomplished by providing:

In an image display method with a fluctuation correction, which method uses an operation machine for displaying a received image on a monitor for enabling an operator to remotely control a moving unit such as a model car, robotic arms in industrial robots and the like through the image provided through a network by a camera of the moving unit and displayed on the monitor, the improvement where:

plotting of the received image on the monitor is conducted at predetermined intervals in plotting timing, and the image thus plotted is used as a predicted image which has been subjected to a time delay processing.

In the image display method with the fluctuation correction described above, according to the second aspect of the present invention, the predicted image having been subjected to the time delay processing is a pseudo image after the elapse of a predicted period of delay time, wherein the predicted period of delay time is calculated by subtracting: a time stamp, which is tagged to the image information received at its reception time; from a system time in plotting timing of the image.

In the image display method with the fluctuation correction described above, according to the third aspect of the present invention, the predicted delay image is obtained by subjecting the received image to an image processing on the basis of sensor information such as the predicted period of delay time, a travel speed of the moving unit, a deviation angle of the moving unit, a battery voltage value and like information.

In the image display method with the fluctuation correction described above, according to the fourth aspect of the present invention, in the image processing, the received image is zoomed and shifted vertically, horizontally or obliquely on the basis of the sensor information.

In accordance with the fifth aspect of the present invention, the above object of the present invention is accomplished by providing:

In a moving unit remote control system provided with an operation machine for remotely controlling a moving unit on the basis of image information supplied from a moving unit such as a model car, robotic arms in industrial robots and the like, the improvement wherein the operation machine comprises:

information receiving means for receiving information for plotting an image, which information comprises image information together with sensor information, wherein said image information is supplied from an on-moving unit camera of the moving unit;

image expansion means for expanding the image data contained in the information for plotting the image having been received;

image processing means for processing the thus expanded image on the basis of the sensor information having been received;

operation input means for converting an operation input value, which is inputted by a controller, into control information adapted for the moving unit; and control information transmitting means for transmitting the control information having been generated by the operation input means to the moving unit;

wherein the moving unit comprises:

image compression means for performing an image compression in which a time stamp is tagged to an image supplied from the on-moving unit camera to prepare the image information which is transmitted to the operation machine;

sensor taking-in means for taking in both a travel speed of the moving unit (i.e., a moving unit speed) and a battery voltage value as the sensor information which is transmitted to the operation machine, wherein the travel speed or moving unit speed is supplied from the moving unit speed sensor and the battery voltage value is supplied from the battery;

means for transmitting the information for plotting the image, wherein both the image information and the sensor information are transmitted to the operation machine as the information for plotting the image;

control information receiving means for receiving the control information supplied from the operation machine; and control processing means for controlling a servo and a motor on the basis of the control information having been received.

In the image display method with the fluctuation correction described in the fifth aspect of the present invention, according to a sixth aspect of the present invention, the image processing means adjusts an image plotting area for displaying the expanded image data on the basis of the sensor information having been received.

Further, in the moving unit remote control system described in the sixth aspect of the present invention, according to a seventh aspect of the present invention, the image processing means: calculates a delay time in plotting the image by subtracting a time of the time stamp from a current system time, wherein the time stamp is stored in the image data having been expanded; calculates an image enlargement ratio based on the delay time in plotting the image and the moving unit speed; calculates an amount of the image shift in a vertical direction or in a horizontal direction or in an oblique direction on the based of both the delay time in plotting the image and a deviated position of the moving unit; whereby the image plotting area is specified on the basis of the image enlargement ratio and the amount of image shift.

In the moving unit remote control system described above in the fifth aspect of the present invention, According to an eighth aspect of the present invention, the sensor information comprises: a moving unit speed value supplied from the on-moving unit speed sensor mounted on the moving unit; and, the battery voltage value.

In effect, in the image display method of the present invention making the fluctuation correction, since the received image is subjected to the image processing process so as to obtain the predicted image (i.e., pseudo image) displayed at equal intervals, any fluctuation is removed. In the case where the motion pictures are transmitted from the camera carried on the moving unit remotely disposed to the personal computer and the like through the Internet, the fluctuation correction is made to obtain the natural image, which enables the operator to realize a precise remote control of the moving unit.

BRIEF DESCRIPTION OF THE DRAWINGS

The above and other objects, advantages and features of the present invention will be more apparent from the following description taken in conjunction with the accompanying drawings in which:

FIG. 19 is a schematic diagram illustrating the communication data in construction in the moving unit's remote control system;

FIG. 22 is a view for explaining the influence on the frame plotting timing exerted by the error.

DETAILED DESCRIPTION OF THE PREFERRED EMBODIMENTS

Figure 1:
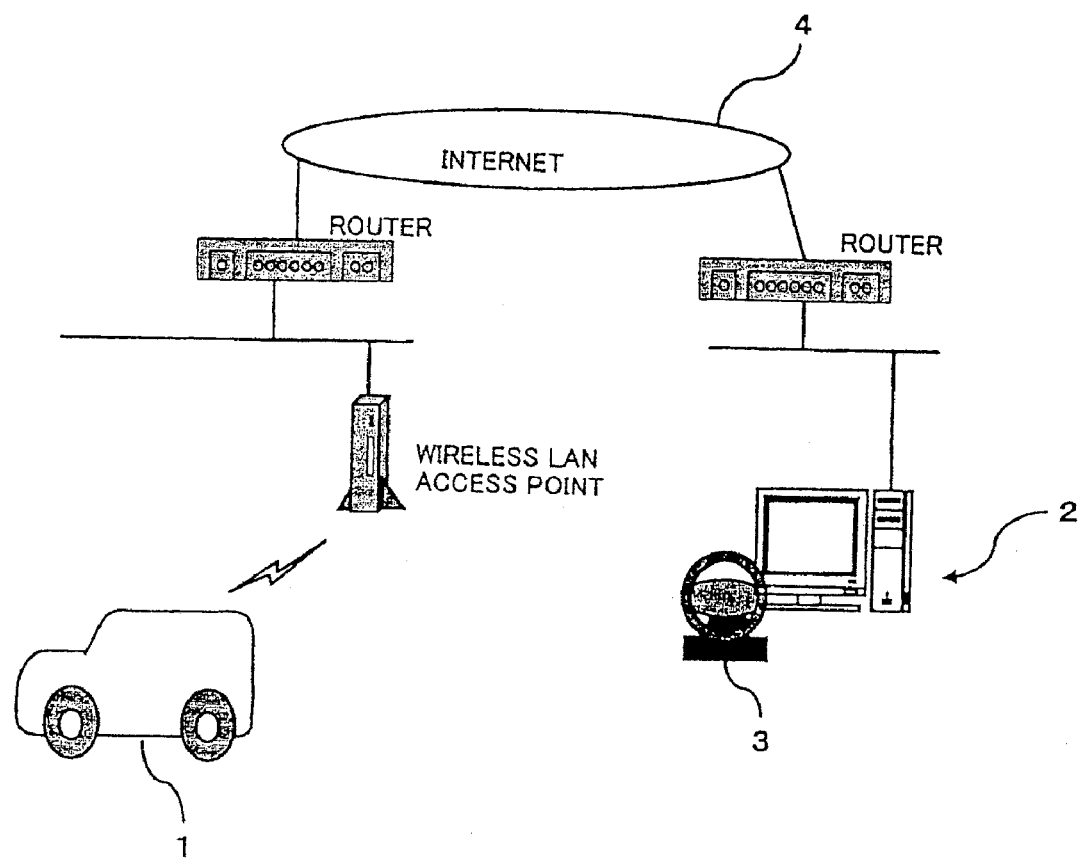
FIG. 1 is a schematic diagram illustrating the entire system in construction as to the remote control system for the moving unit in an embodiment of the present invention, wherein the system uses the operation machine.

The best modes for carrying out the present invention will be described in detail using embodiments of the present invention with reference to the accompanying drawings.

In the drawings: the reference numeral 1 denotes a model car; 2 an operation machine; 3 a controller; 4 the Internet; 5 a camera; 6 a moving unit speed sensor; 7 a battery; 8 a servo; 9 a drive motor; 9a a drive motor; 10 a gear box; 10a a gear box; 11 anon-moving unit computer; 12 a video capture section; 13 an internal clock; 14 a wireless LAN communication section; a motor control section; and, 16 a sensor input section.

In the following description, although a moving unit used in the embodiments of the present invention will be described as the model car 1 as shown in the drawings, it is also possible to apply the present invention to any other model planes, model ships, robots, robotic arms of industrial robots and the like as is in the case of the model car 1. As a whole, a remote control system of the present invention comprises such a model car and the operation machine 2, as is clear from FIG. 2. More specifically, this system is constructed of: the model car 1, which is the moving unit carrying the camera 5; the operation machine 2 provided with a monitor for an operator, who controls the model car 1 disposed in a remote area separated away from the model car 1; and, a communication means such as the Internet 4 and like means.

In the operation machine 2, its monitor displays an image shot by the camera 5 of the model car 1. The operator operates a game controller and the like such as a steering controller, a joy stick and like controllers while monitoring the image shot by the camera 5 of the model car 1, and performs an input operation of control information. This input operation enables the operator to control the model car 1. In the side of the model car 1 having received the control information, the on-moving unit computer 11 retrieves various kinds of control data from the thus received control information to control the servo (steering) 8 and the drive motors 9, 9a in a condition in which the servo 8 and the motors 9, 9a have been already actuated. This makes it possible for the operator to operate the model car 1 in accordance with the control information having been inputted through the operation machine 2.

Figure 2:
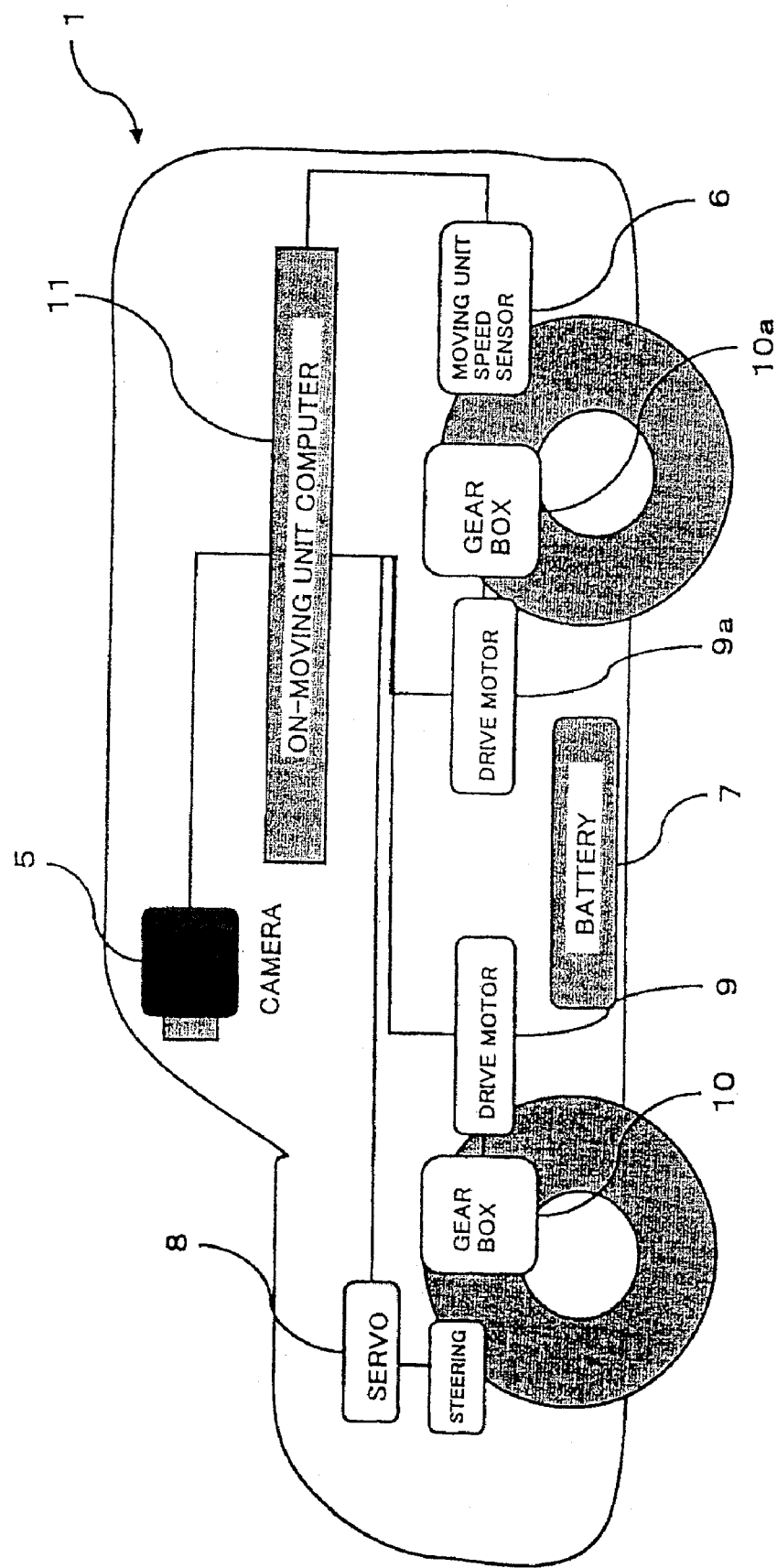
FIG. 2 is a block diagram illustrating the moving unit in construction in an embodiment of the present invention.

FIG. 2 is a block diagram illustrating the moving unit or model car 1 of the embodiment of the present invention in construction. The model car 1 in the embodiment of the present invention is connected with a wireless LAN. Further, the model car 1 has: not only the function of generating "sensor information" as to the moving unit speed sensor 6 mounted inside the model car 1 and the function of processing "transmission information" such as the function of generating "image information" in which the addition of a time stamp value to a camera captured image that is an image captured by the camera 5 and like calculations are carried out; but also the control function of carrying out a predetermined processing with respect to the servo 8 and the drive motors 9, 9a. As shown in FIG. 2, the model car 1 of this embodiment of the present invention is provided with: the camera 5, which realizes the function of generating the image information; the moving unit speed sensor 6, which realizes the function of generating the sensor information; the battery 7; the servo 8 together with the drive motors 9, 9a, which realize the control function; the gear boxes 10, 10a; and, the on-moving unit computer 11, which serves as means for realizing various kinds of functions and processing.

Figure 3:
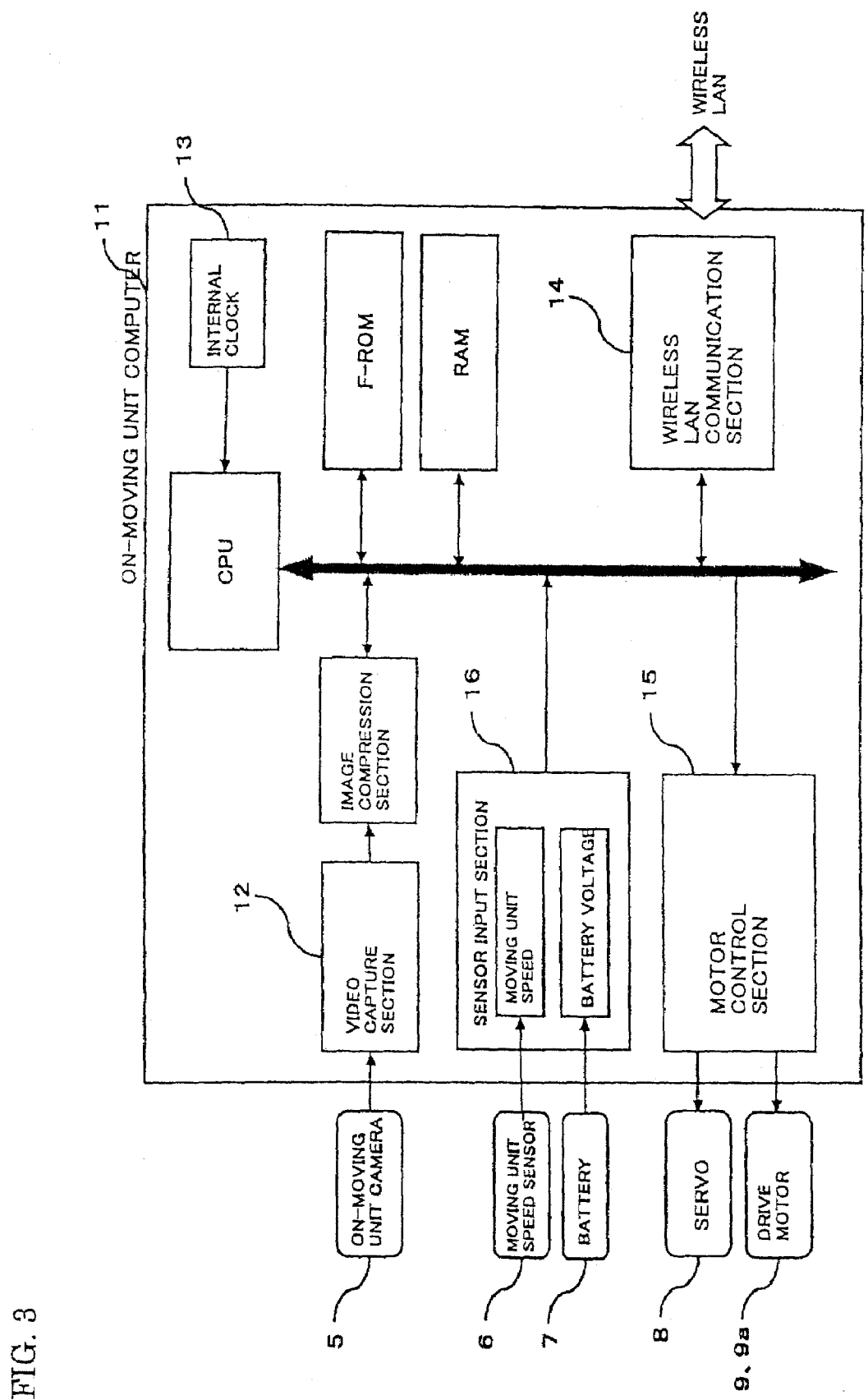
FIG. 3 is a view illustrating the on-moving unit computer in construction.

As shown in FIG. 3, the on-moving unit computer 11 is provided with an image compression means, a sensor taking-in means, a control processing means and a control information receiving means which may include: a CPU, which performs various kinds of calculations and processing of data in controlling each unit: an F-ROM, in which although the contents once written or stored therein cannot be erased, the F-ROM can keep the contents even when the power supply is interrupted; a ROM, which uses a semiconductor device; the internal clock 13; the video capture section 12; an image compression section; the sensor input section 16; the motor control section 15; and, the wireless LAN communication section 14.

Figure 4:
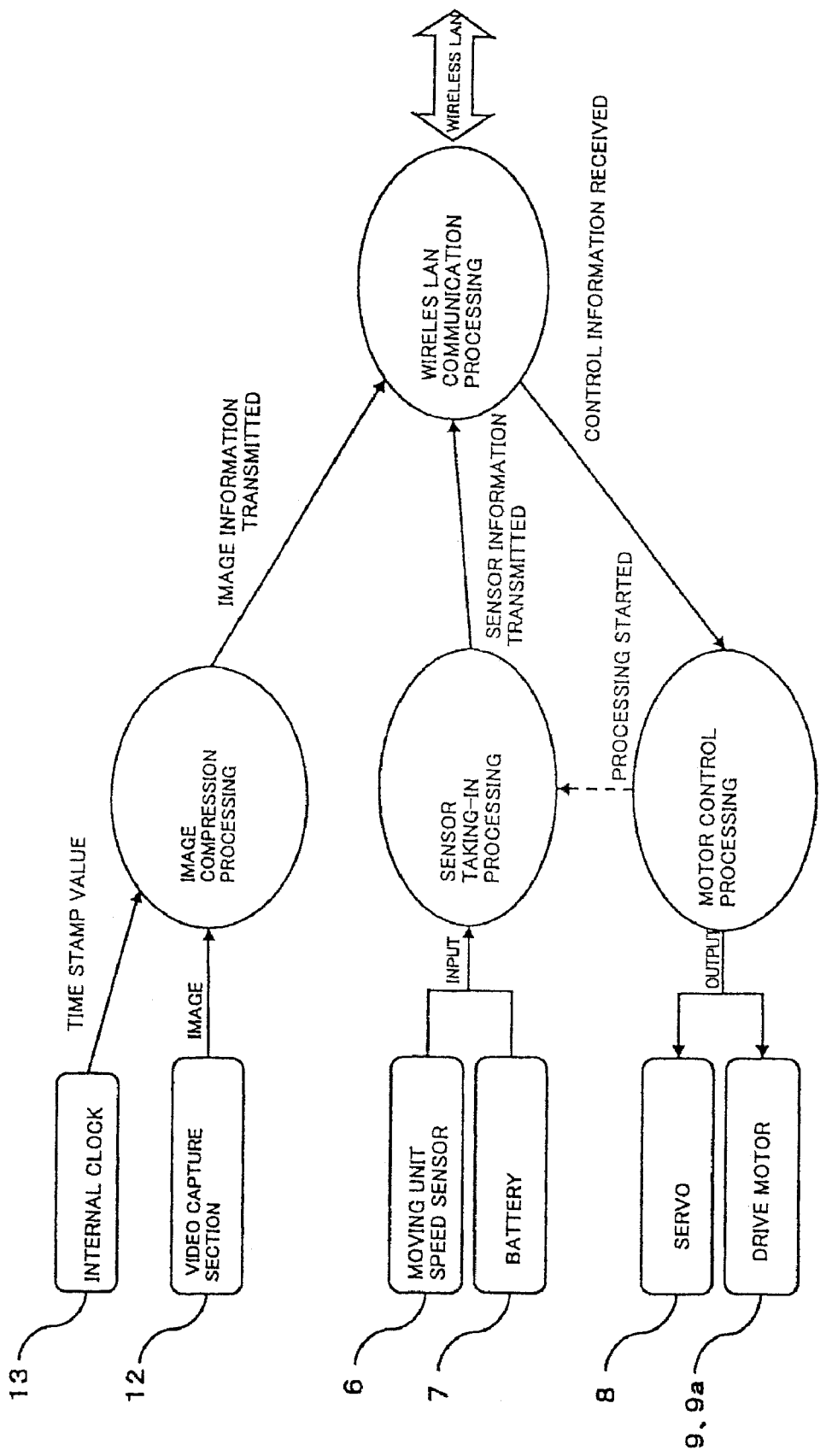
FIG. 4 is a block diagram illustrating the process conducted in the on-moving unit computer.

Further, in construction, as is clear from FIGS. 2 and 3, the on-moving unit computer 11 is connected with: the camera 5; the moving unit speed sensor 6; the battery 7; the servo 8; and, the drive motors 9, 9a. In function, as shown in FIG. 4, the computer 11 performs various kinds of processing of information, wherein a piece of the information is transmitted to the operation machine 2 and another piece of the information is received from the operation machine 2.

Performed in processing of the information transmitted to the operation machine 2 are: the image compression processing in which a time stamp value is added to the image received from the video capture section 12 and the thus time stamp added image is then compressed; and, the sensor taking-in processing in which both a moving unit speed determined by the moving unit speed sensor 6 and a battery voltage value of the battery 7 are taken in as "sensor information". In processing of the information received from the operation machine 2, the motor control processing is performed so that the servo 8 and the drive motors 9, 9a are controlled in accordance with the control information having been received.

In the operation machine 2 of the embodiment of the present invention: of the images shot by the on-moving unit camera 5, a predetermined plotting area or image is displayed on the monitor. Under such circumstances, the condition of the model car 1 is recognized and judged from the results having been detected by the speed sensor 6 and the like mounted in the model car 1 to determine the condition; and, according to the judged condition, an output is issued so as to display the image shot by the camera and display a value of the speedometer or moving unit speed sensor 6 and the remaining amount of the battery 7, wherein the function of issuing such an output is performed in conjunction with both the image information supplied from the model car 1 and the sensor information. For example, the processing for receiving "information for plotting the image" such as "image data", "time stamp", "moving unit speed", "battery voltage value" and the like" is performed. Then, the image information and the sensor information both contained in the "information for plotting the image" are judged. Based on such judgment, processing adapted for an image subsequent to the previous image and shot by the camera 5 is then performed.

Here, an image display method of the present invention will be described in more detail. The method makes a correction to fluctuations and is used in the system described above.

The image display method is characterized in that:

in an operation machine for displaying a received image on a monitor for enabling an operator to remotely control a moving unit such as a model car through the image, which image is provided through a network by a camera of the moving unit and displayed on the monitor, plotting of the received image on the monitor is conducted at predetermined intervals in plotting timing, and the image thus plotted is used as a predicted image which has been subjected to a time delay processing.

The predicted image thus subjected to the time delay processing is a pseudo image obtained after the elapse of a predicted period of delay time, wherein the predicted period of delay time is calculated by subtracting: a time stamp, which is tagged to the image information received at its reception time; from a system time in the image plotting timing. In the predicted delay image, the received image is subjected to the image processing on the basis of various kinds of the sensor information such as the predicted period of delay time, the moving unit speed, the steering angle, the battery voltage value and like information. Further, the image processing is performed so as to have the received image zoomed and/or shifted vertically, horizontally or obliquely on the basis of the sensor information.

Figure 5:
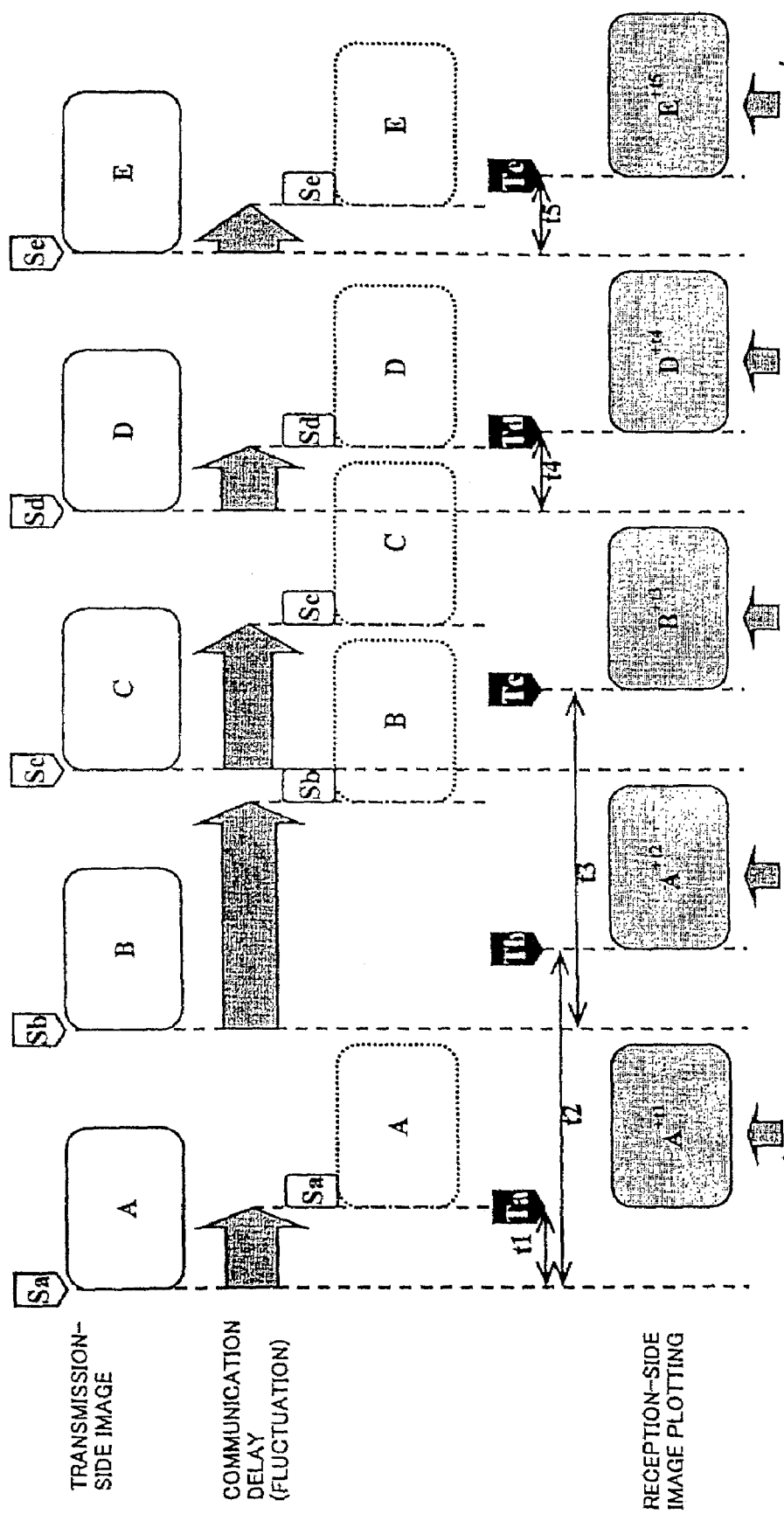
FIG. 5 is a view for explaining the fluctuation correction.

Now, a process of fluctuation correction will be described in detail with reference to FIGS. 5 to 8. In FIG. 5, each of the reference letters Sa, Sb, Sc, Sd and Se appearing in a row of the transmission-side images denotes an individual shooting time of the camera, in which an individual image is retrieved from the camera. On the other hand, each of the reference letters Sa, Sb, Sc, Sd and Se appearing in a row of fluctuations denotes an individual time stamp, which is tagged to the individual image information to show the individual shooting time of the camera at a time when the individual image is shot by the camera. Lastly, each of the reference letters Ta, Tb, Tc, Td and Te appearing in a row of individual reception-side image plotting operations denotes an individual time in plotting timing of the image.

In the reception-side image plotting operations, individual predicted delay images are plotted at equal intervals. As a result, smooth motion pictures can be obtained without suffering from variations in plotting timing and without suffering from any fluctuation. The predicted delay period of time "t" of the motion pictures is equal to a period of time "T-S", where: T is a plotting time in timing; S is a time stamp tagged to the image information under current reception; and, therefore the period of time "T-S" is calculated by subtracting the time stamp "S" from the plotting time "T" in timing.

Figure 6:
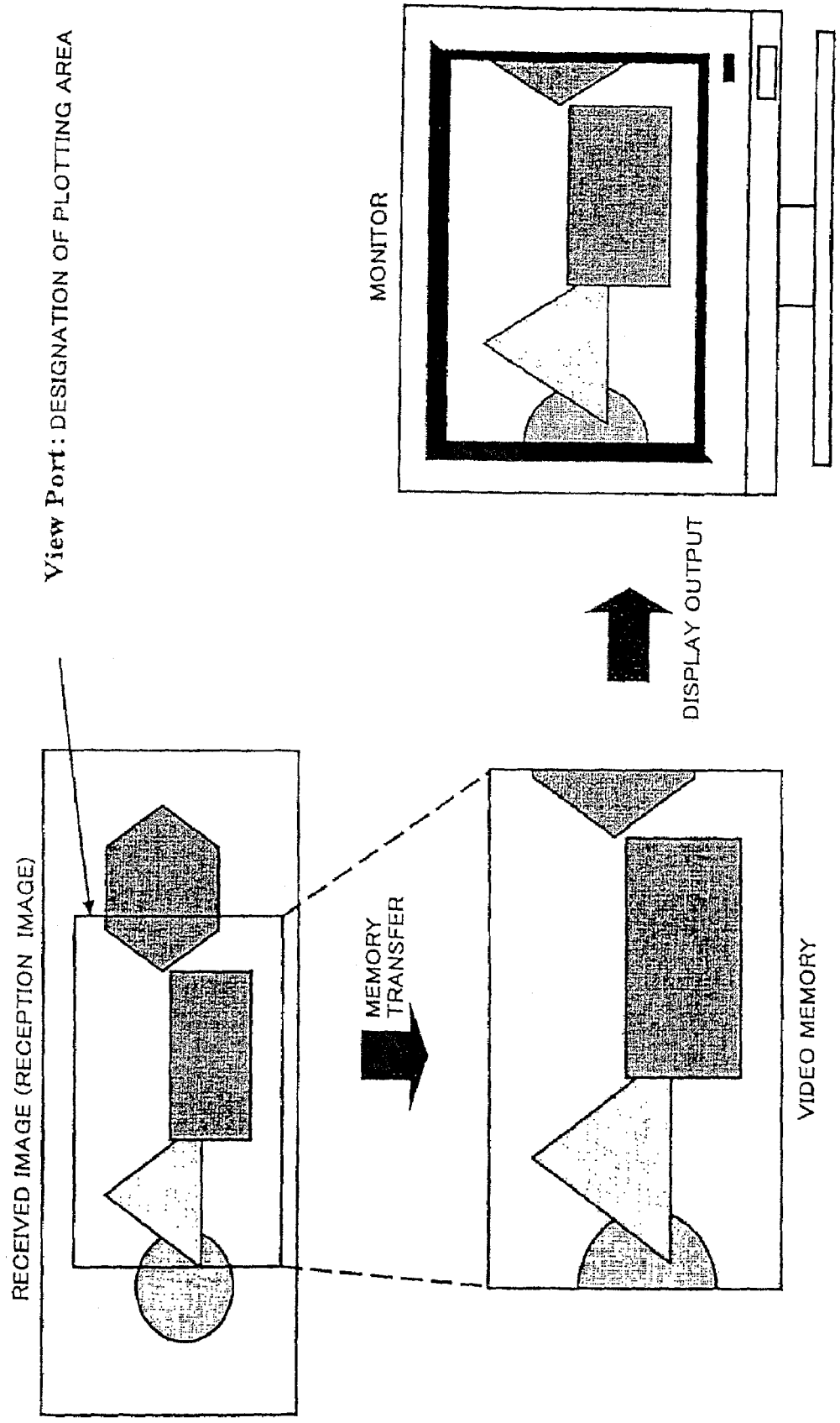
FIG. 6 is a view for explaining a plotting function of the operation machine.
Figure 7:
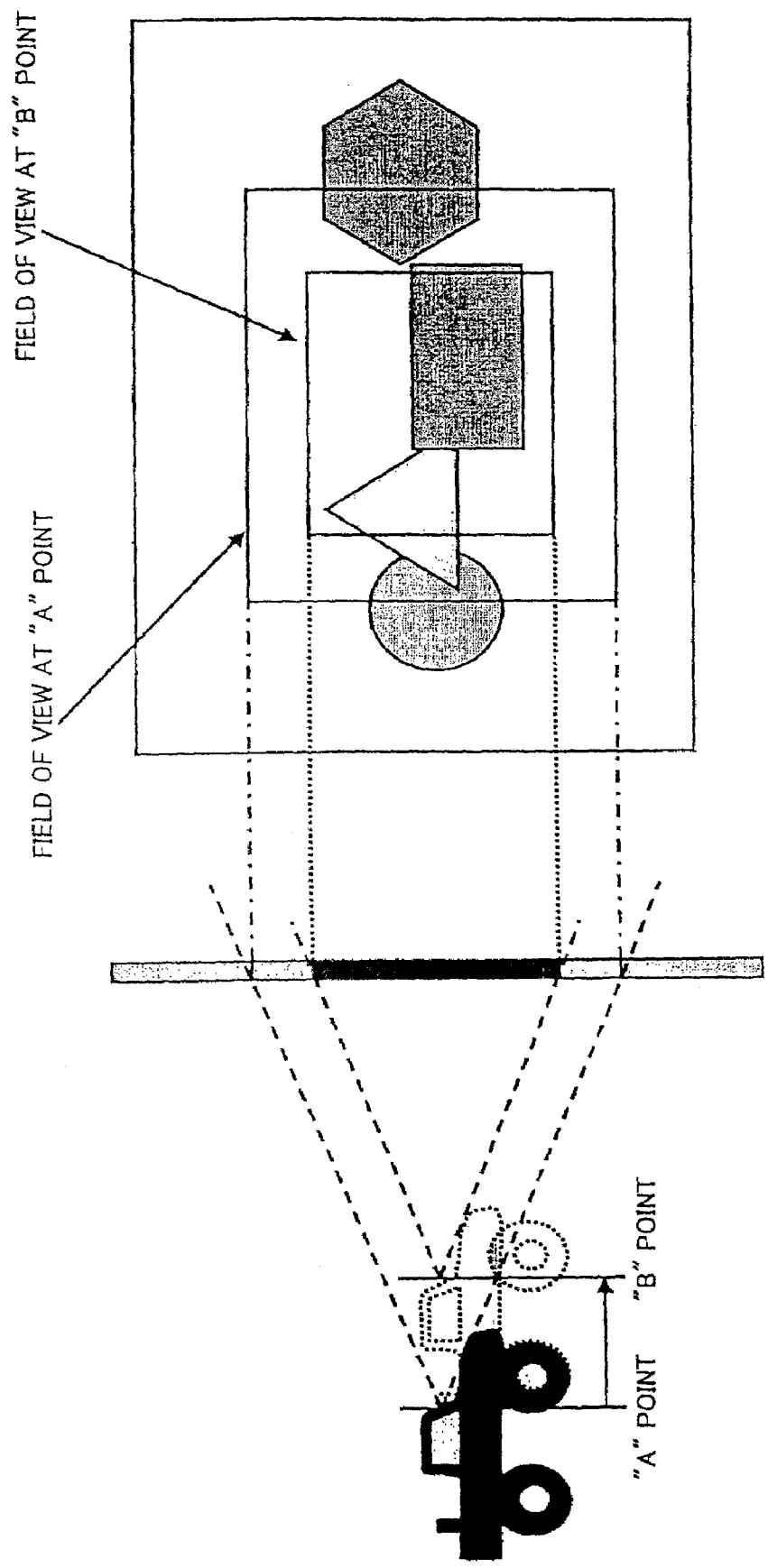
FIG. 7 is a view for illustrating a change in plotting area at a time when the moving unit moves straight.
Figure 8:
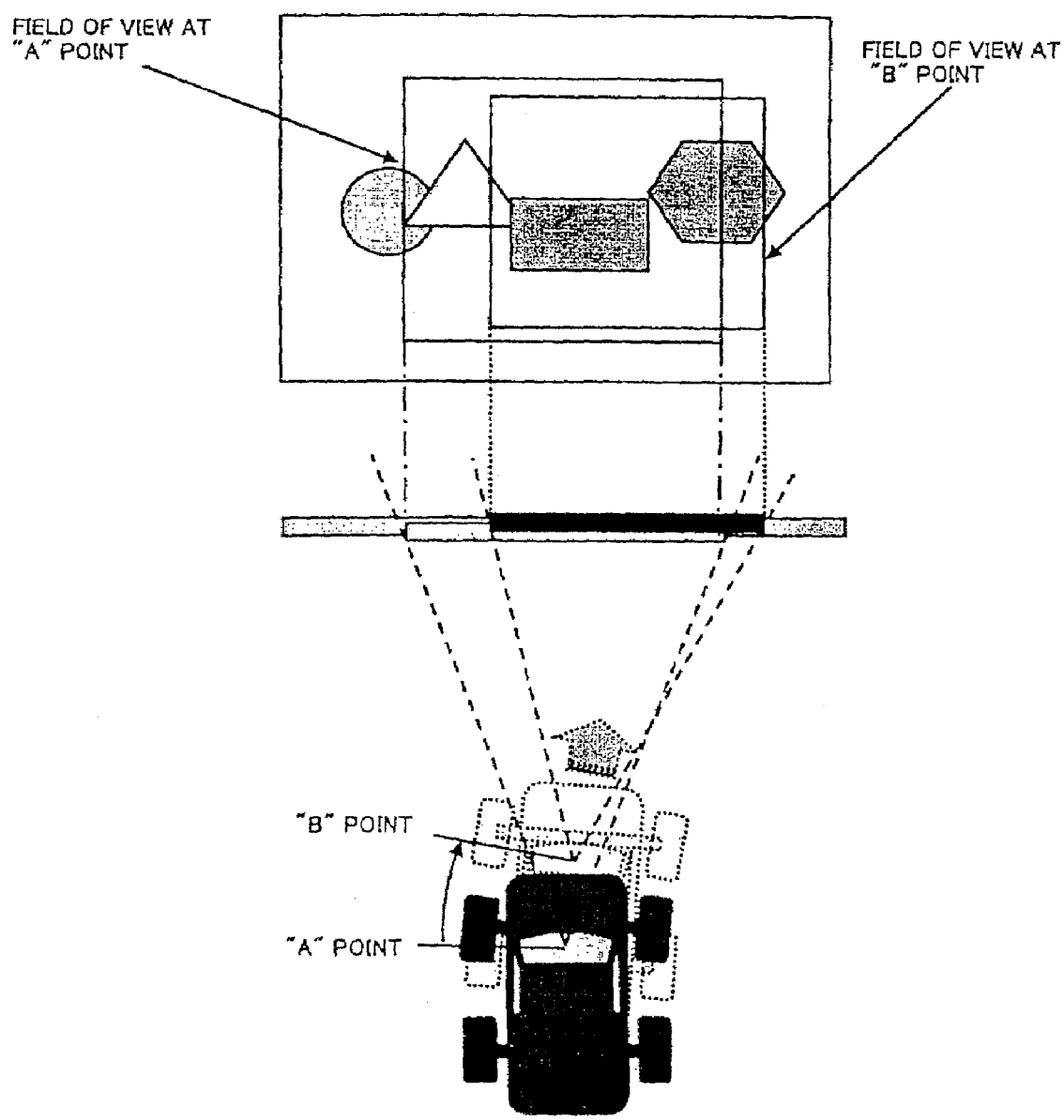
FIG. 8 is a view for illustrating a change in plotting area at a time when the moving unit turns to the right.

FIGS. 6, 7 and 8 illustrate the function of plotting the predicted delay image of the operation machine 2. As is clear from FIG. 6, the operation machine 2 has the function of memory-transferring a range of the plotting area of the received image, which function is realized by specifying the plotting area on the received image. Owing to the provision of this function, it is possible to display an arbitrary area of the received image.

FIG. 7 illustrates changes in plotting area at a time when the model car 1 travels in a straight line. In FIG. 7, various changes in plotting area, which are displayed on the monitor of the operation machine 2 when the model car 1 travels in a straight line from a point "A" to another point "B", are illustrated there. As is clear from such changes in plotting area, in the case where the model car 1 simply travels in a straight line, it suffices to zoom in only the area in a center of a view point in a condition in which the center of the viewpoint is kept unchanged relative to the received image. In this case, the amount of zooming operation is calculated on the basis of the moving unit speed which is the sensor information.

Further, FIG. 8 illustrates the changes in plotting area of the image when the model car 1 turns to the right. Shown there are the changes in plotting area displayed on the monitor of the operation machine 2 in the case where the model car 1 travels from the point "A" to the point "B" so as to turn to the right. As is clear from the changes in plotting area displayed on the monitor, when the model car 1 turns to the right, it suffices to zoom in the center of the view point in a condition in which the center of the view point is gradually shifted to the right side relative to the received image. In this case, the zooming amount and the shifting amount are calculated on the basis of the moving unit speed and the steering angle (i.e., deviation angle) both of which are the sensor information.

As described above, in the image display method of the present invention: the sensor information is used to generate the predicted delay image of after the elapse of the predicted time delay of the received image; this predicted delay image is plotted at a time in plotting timing so that a correction is made to a fluctuation in communication, which makes it possible to obtain a real-time motion picture having a natural feeling without suffering from any feeling of disorder in picture.

Next, a flow of a series of processing operations will be descried in essence. These processing operations are performed with respect to: the model car 1, the operation machine 2, the operator's control. First, in the model car 1, a time stamp of the internal clock is tagged to the camera image and the image compression processing is performed to produce the image information. Then, this image information is transmitted to the operation machine 2 to become a first data.

Taken in the sensor taking-in processing operation are: a moving unit speed value obtained by the moving unit speed sensor 6; and, a battery voltage value of the battery 7. The moving unit speed value and the battery voltage value thus taken in the processing operation become the second data, which is transmitted to the operation machine 2 and serves as the sensor information.

The image information generated through the image compression operation and the sensor information generated through the sensor taking-in processing operation are transmitted through a communication processing operation to serve as information to be transmitted to the operation machine 2. The operation machine 2 receives this information through the communication processing operation, and delivers the image information and the sensor information to an image expansion processing operation and an image processing process, respectively.

In the image expansion processing operation, the image data contained in the image information is expanded and delivered to the image processing process. An image to be plotted on the monitor is generated on the basis of the expanded image data, the time stamp and the sensor information, and outputted to the monitor.

The operator operates the game controller while watching the image which is shot by the camera and displayed on the monitor. The control information inputted through the operation of the game controller is transmitted to the model car 1 through communication processing. In the side of the model car 1, the servo 6 and the drive motors 9, 9a are controlled on the basis of the control information having been received.

Figure 9:
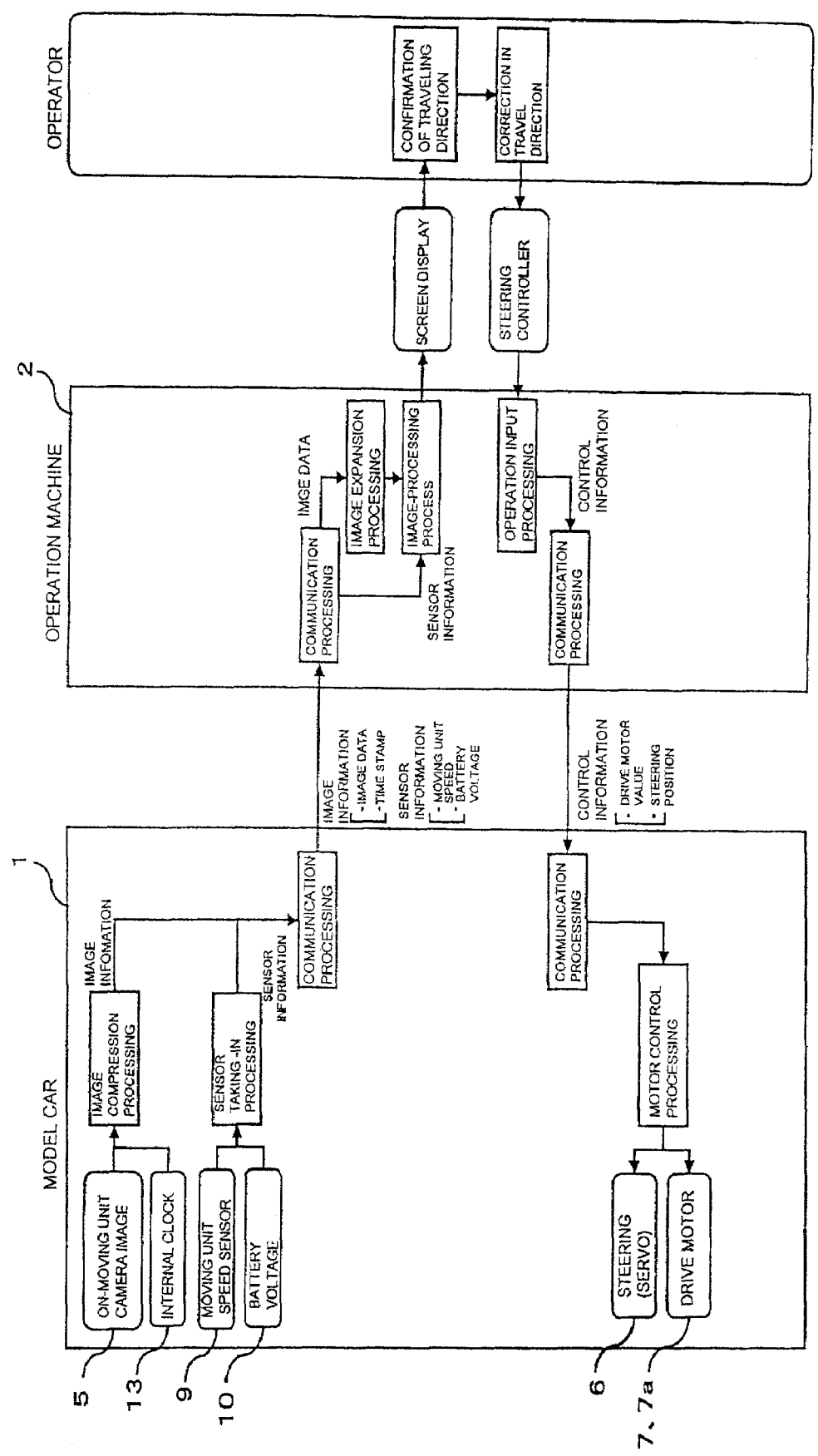
FIG. 9 is a flowchart of a series of processes performed by the operator and the hardware.
Figure 10:
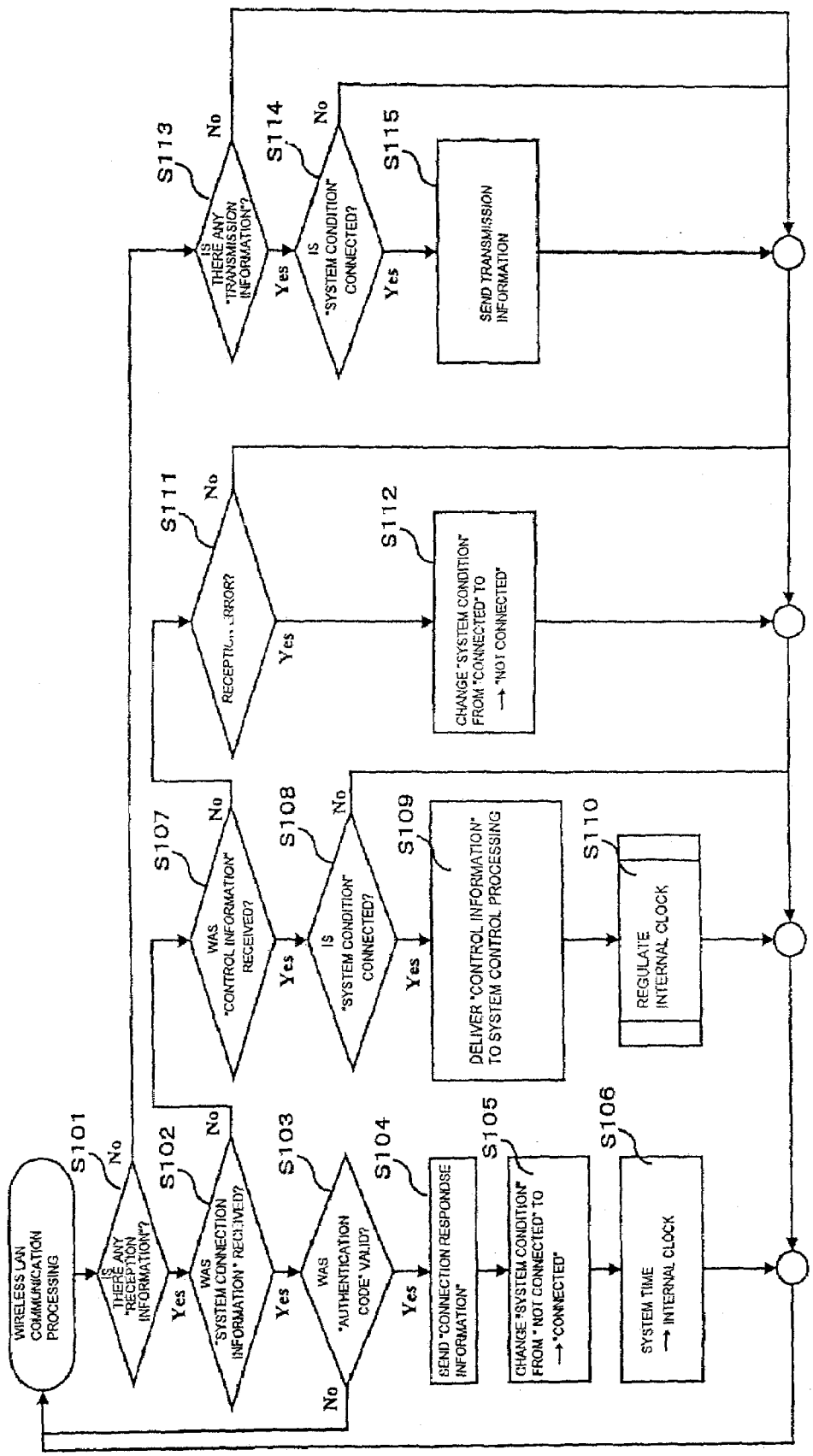
FIG. 10 is a flowchart of the communication processing in the side of the moving unit.

Hereinafter, individual processing operations in the flowchart shown in FIG. 9 described above will be described in detail. First, a wireless LAN communication processing operation of the on-moving unit computer 11 according to the present invention will be described with reference to a flowchart shown in FIG. 10. As is clear from this flowchart, when the wireless LAN communication section 14 of the on-moving unit computer 11 is in a normal condition, this section 14 waits till it receives a piece of "system connection information" in a step S101 of the flowchart, wherein the system connection information is issued from the operation machine 2.

Under such circumstances, when information is received in the step S101, it is judged as to whether or not the information thus received is the system connection information in a step S102 subsequent to the step S101. When it is judged that the information is the system connection information issued from the operation machine 2, it is then judged as to whether or not an authentication code is valid in a step s103 subsequent to the step S102.

When it is judged that the authentication is valid, a piece of "connection response information" is transmitted to the operation machine 2 or a sender of the system connection information in a step S104 subsequent to the step S103. In a step S105 subsequent to the step S104, a condition of the system is changed from a condition "not connected" to a condition "connected". In a step S106 subsequent to the step S105, the internal clock 13 is regulated so as to indicate the same time as that of the system time data contained in the system connection information.

On the other hand, in the step S102, when the received information issued from the operation machine 2 is not the system connection information, the step S102 is followed by a step S107. In the step S107, it is judged as to whether or not the received information is a piece of control information. When the received information is the control information, the step S107 is followed by a step S108. In the step S108, it is judged as to whether or not the condition of the system is the "connected" condition. When the condition of the system is the "connected" condition, the step S108 is followed by a step S109. In the step S109, the control information is delivered to a motor control processing operation. The step S109 is followed by a step S110. In the step S110, the internal clock is regulated in its time regulation processing operation. On the other hand, in the step S107, when the received information is not the control information, the step 107 is followed by a step S111. In the step S111, it is judged as to whether or not any error occurs in reception. When it is judged that some error occurs in reception in the step S111 the step S111 is followed by a step S112. In the step S112, the system condition is changed from the "connected" condition to the "not connected" condition.

In the previous step S101, when information is not received, the step S101 is followed by a step S113. In the step 113, it is judged as to whether or not any "transmission information" directed to the operation machine 2 exists. In case that the transmission information is found to exist in the step S113, the step S113 is followed by a step S114. In the step S114, it is judged as to whether or not the system condition is the "connected" condition. When the system condition is found to be the "connected" condition, the step S114 is followed by a step S115. In the step S115, the transmission information is transmitted.

Figure 11:
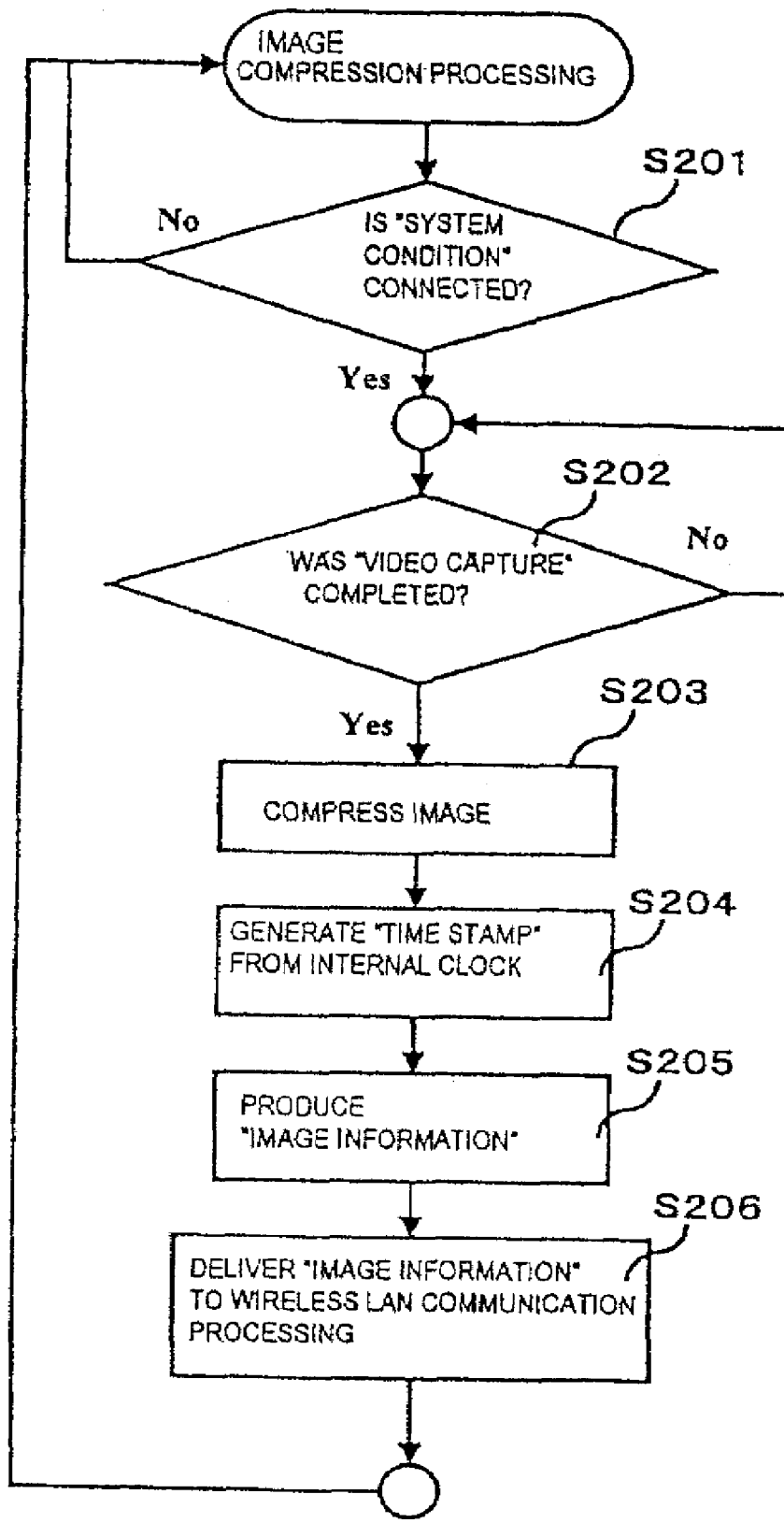
FIG. 11 is a flowchart of the image compression process.

Next, with reference to a flowchart shown in FIG. 11, the image compression processing operation of the on-moving unit computer 11 will be described. In its normal condition, the on-moving unit computer 11 judges in a step S201 as to whether or not the system condition is the "connected" condition with respect to the operation machine 2 in the system. When the system condition is found to be the "connected" condition in the step S201, the step S201 is followed by a step S202. In this step 202, it is judged as to whether or not a so-called "video capture" having been started is completed. When the video capture is completed, the step S202 is followed by a step S203. In the step S203, the thus captured image is compressed. The step S203 is followed by a step S204. In the step 204, a time stamp is generated based on the internal clock 13. The step S204 is followed by a step S205. In the step S205, the thus generated "time stamp" is tagged to the compressed image to prepare the image information. The step S205 is followed by a step S206. In the step S206, the thus prepared image information is delivered to the wireless LAN communication processing operation.

Figure 12:
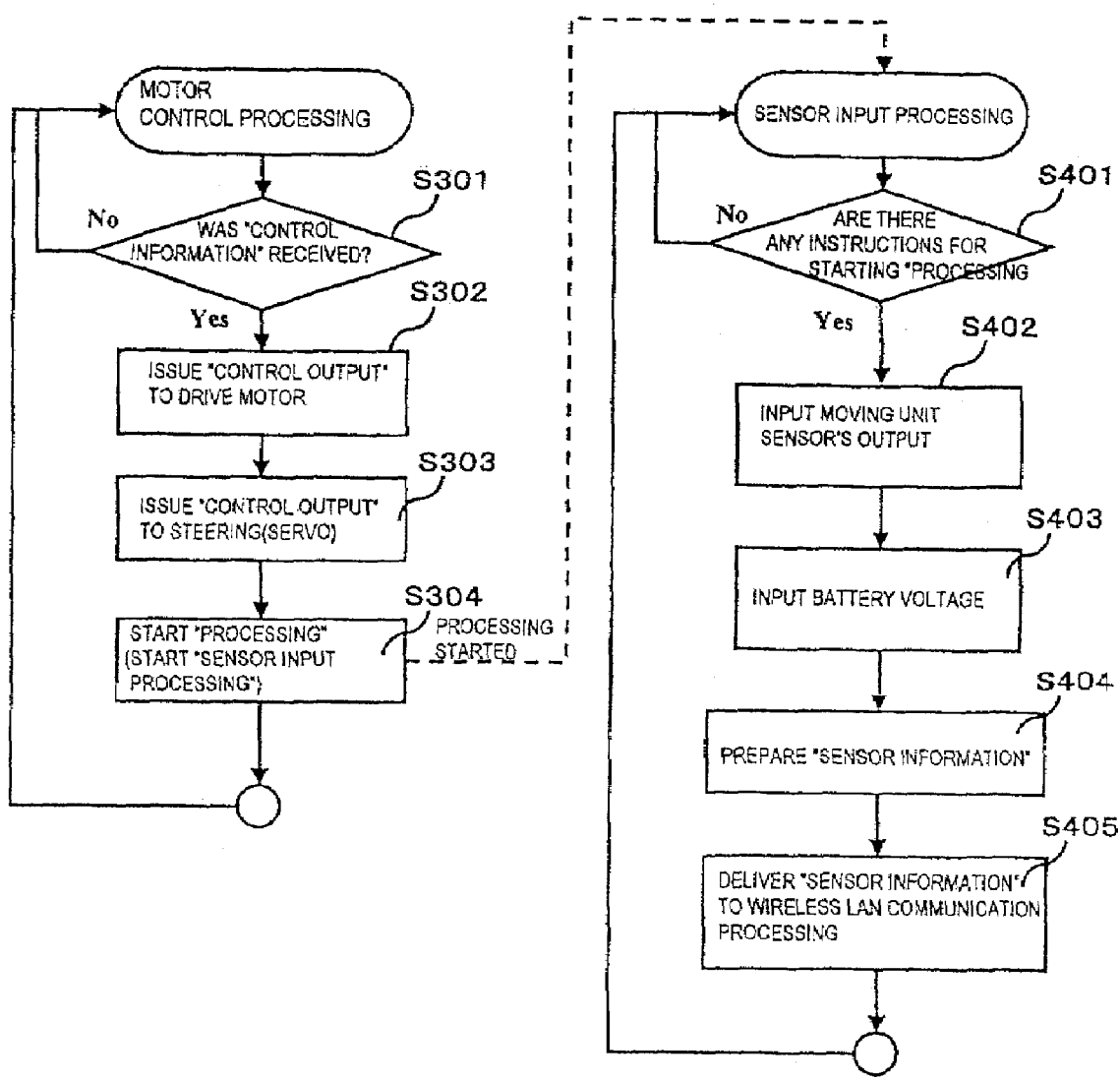
FIG. 12 is a flowchart showing the motor controlling process and the sensor input process.

Next, according to the present invention, a motor control processing operation of the on-moving unit computer 11 and a sensor input processing operation will be described with reference to a flowchart shown in FIG. 12. In its normal condition, the motor control section 15 waits till it receives the control information issued from the operation machine 2. In a step S301 of the flowchart, it is judged as to whether or not the control information is received. When the motor control section 15 receives the control information, the step S301 is followed by a step S302. In the step S302, a motor control output is issued to the drive motors 9, 9a according to information of a drive motor value contained in the control information, so that the drive motors 9, 9a are controlled. The step S302 is followed by a step S303. In the step 303, a steering (servo) control output is issued to the servo 8 according to information of a servo position contained in the control information.

In order to use the moving unit speed and the battery voltage value both of which are obtained immediately after controlled in the motor control processing operation and serve as the sensor information to be transmitted to the operation machine 2, when the drive motors 9, 9a and the servo 8 are controlled through the motor control processing operation, a sensor input processing operation starts in conjunction with the start of the motor control processing operation in a step S304 subsequent to the step S303.

The sensor input processing operation will be described with reference to another flowchart shown in FIG. 12, In a step S401 of the flowchart, it is judged as to whether or not some instructions for starting the processing operation exist. When the instructions for starting the processing operation exist, the step S401 is followed by a steps 402. In the step 402, data of the moving unit speed supplied from the moving unit speed sensor 6 is supplied to the sensor input section 16. After that, the step S402 is followed by a step s403. In the step S403, data of the battery voltage supplied from the battery 7 is supplied to the sensor input section 16. The step S403 is followed by a step S404. In the step 404, a piece of sensor information is prepared on the basis of the thus supplied data. The step 404 is followed by a step S405. In the step S405, the thus prepared sensor information is delivered to the wireless LAN communication section 14 in order to transmit the sensor information to the operation machine 2.

Figure 13:
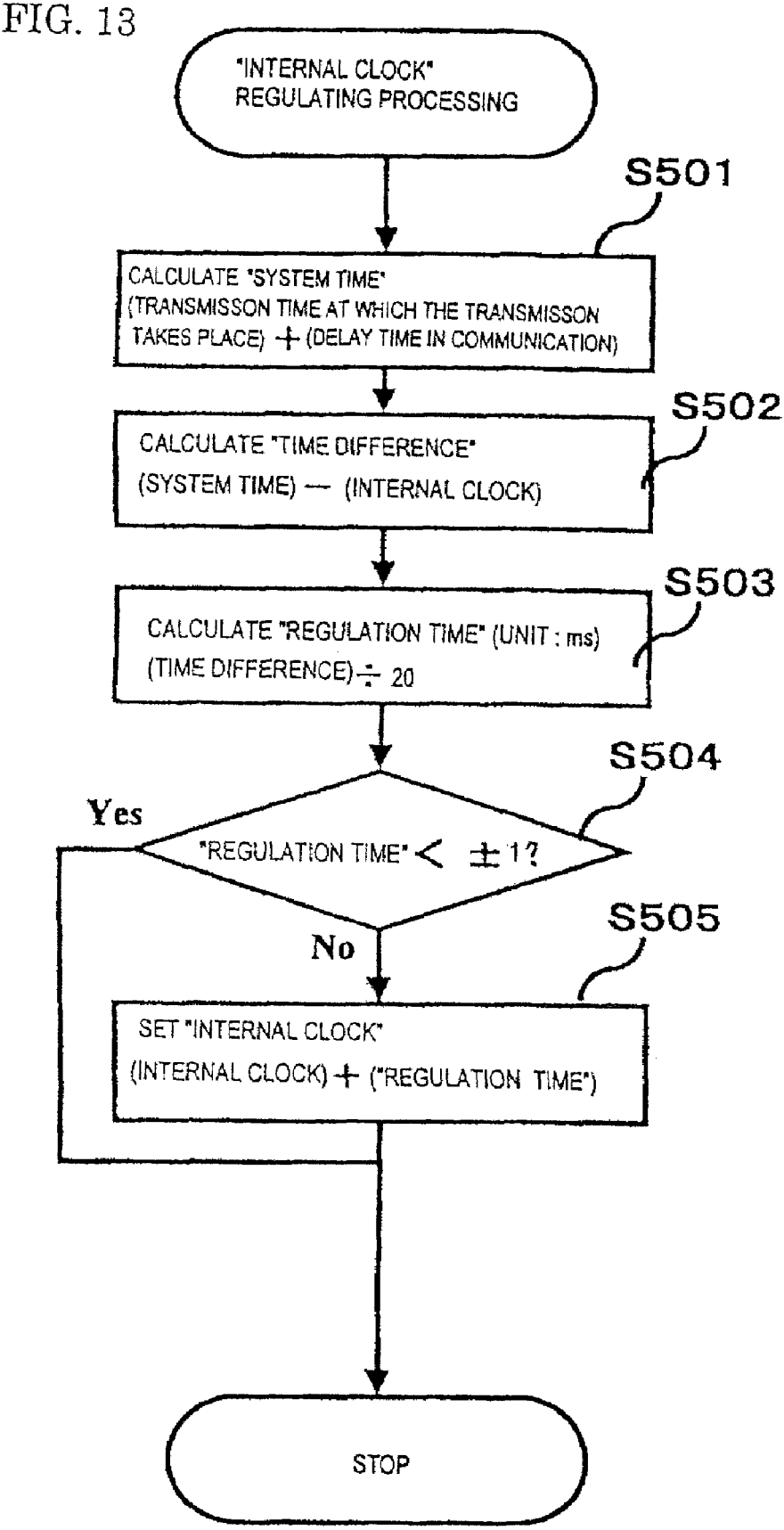
FIG. 13 is a flowchart of the internal clock's regulating processing.

Now, with reference to a flowchart shown in FIG. 13, an internal clock regulating processing operation of the on-moving unit computer 11 of the present invention will be described. In a step S501, the system time is calculated by adding a "transmission time" (at which the transmission takes place) to a "delay time" in communication. The step S501 is followed by a step S502. In the step S502, a time difference is calculated by subtracting the internal clock from the system time. The step S502 is followed by a step S503. In the step S503, a "regulation time" is calculated by dividing the time difference by 20 (time unit: ms). In other words, the time unit of the regulation time is defined to be a twentieth (i.e., 1/20) to absorb excessive changes. This processing operation is performed when the operation machine 2 is connected to the system.

The step S503 is followed by a step S504. In the step S504, it is judged as to whether or not the regulation time is smaller than 1 ms. In the case where the regulation time is smaller than 1 ms, the internal clock 13 is not reset. On the other hand, when the regulation time is not smaller than 1 ms, the step S504 is followed by a step S505. In the step S505, the internal clock 13 is reset. In other words, the regulation time is added to the time of the internal clock 13 in the step S505.

The operation machine 2 is constructed of a personal computer in which a program for remotely controlling the model car 1 is stored. The operation machine 2 is connected to an information receiving means comprising a wireless LAN access point, routers, and the internet 4. The operator operates the operation machine 2 to remotely control the model car 1.

Figure 14:
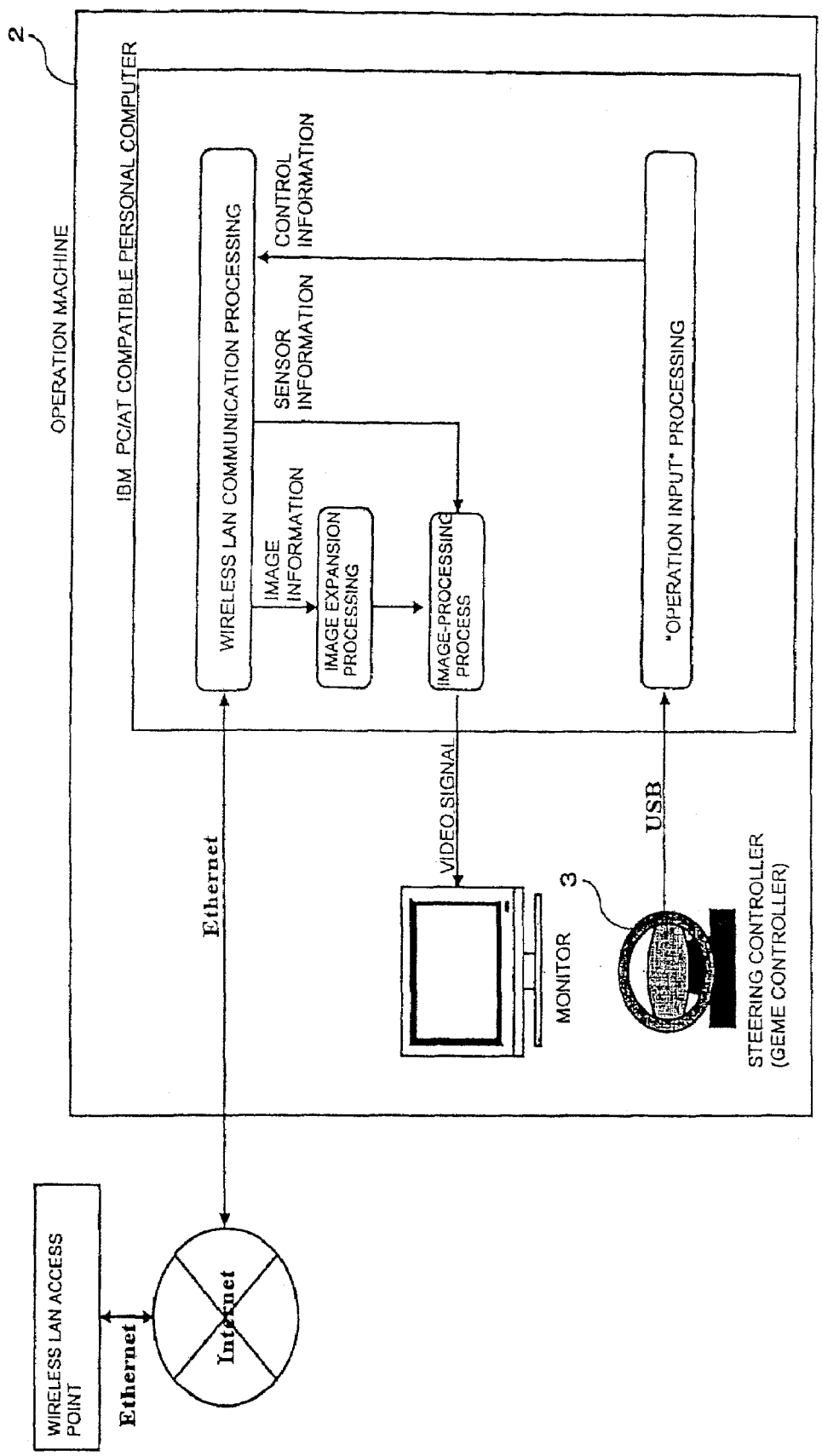
FIG. 14 is a block diagram illustrating the processing conducted in the operation machine.

Next, a processing operation performed in the operation machine 2 of the present invention will be described. As shown in FIG. 14, generally speaking, the processing operation performed in the operation machine 2 is substantially divided into two sub-processing operations, one of which is based on data transmitted from the model car land the other is based on data supplied from the game controller 3.

The sub-processing operation based on data transmitted from the model car 1 comprises: the image expansion and processing means accomplished by a program stored on the computer of operating machine 2 for expanding the image information having been received through the wireless LAN communication processing; and, the image processing process for generating a video signal for displaying the expanded image on the monitor on the basis of the sensor information having been received, wherein the expanded image having been subjected to the image expansion processing.

On the other hand, the sub-processing operation based on data supplied from the game controller 3 is described in the drawings as a "operation input" processing operation. The operation input is accomplished by the means of a game controller, joystick, steering wheel, or similar controller attached to the computer of operating machine 2, on which computer a program for processing the controller input is stored. The control information having been processed in this processing operation is transmitted to the model car 1 through the control information transmitting means consisting of a wireless LAN access point, routers, and the internet 4.

Figure 15:
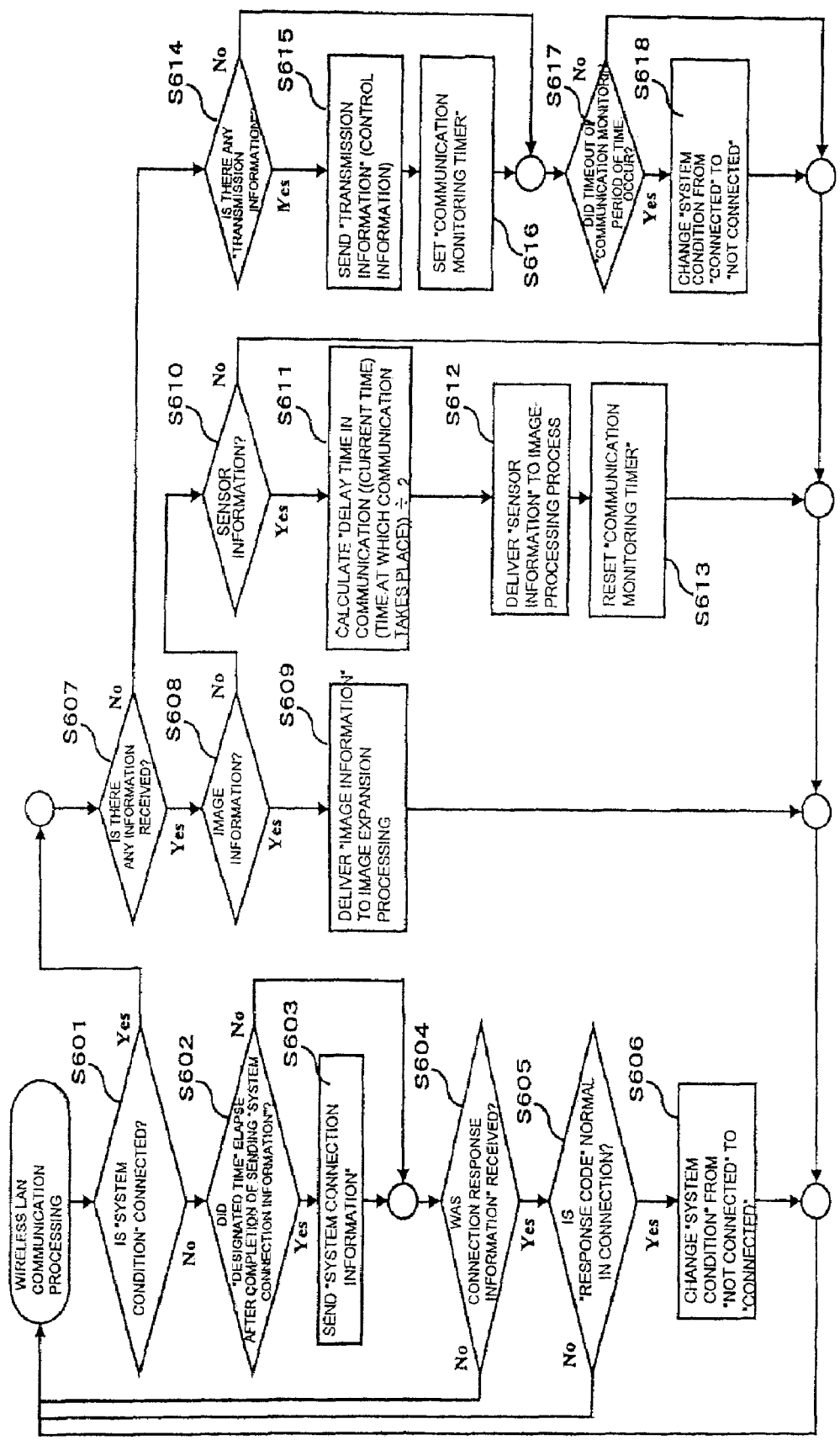
FIG. 15 is a flowchart of the communication processing conducted in the side of the operation machine.

Now, with reference to a flowchart shown in FIG. 15, a wireless LAN communication processing operation of the operation machine 2 of the present invention will be described. In a step S601 of the flowchart, it is judged as to whether or not the system condition is a "connected" condition in a normal condition, wherein the term "connected" condition means a connected condition to the model car 1. When the model car 1 is out of connection, the step S601 is followed by a step S602. In the step S602, it is judged as to whether or not a "designated time" elapses, wherein the "designated time" is counted from a time when the system connection information, which has been transmitted in the previous connection time, is transmitted. When the designated time has elapsed, the step S602 is followed by a step S603. In the step S603, the system connection information is transmitted again. The step S603 is followed by a step S604. In the step S604, it is judged as to whether or not a piece of "connection response information is received. When the "connection response information was received, the step S604 is followed by a step S605. In the step S605, it is judged as to whether or not a "response code" is normal in connection. When the "response code" is normal in connection, the step S605 is followed by a step S606. In the step S606, the system condition is changed from the "not connected" condition to the "connected" condition.

On the other hand, in the previous step S601, when the system condition is the "connected" condition, the S601 is followed by a step S607. In the step S607, it is judged as to whether or not there is some information received from the model car 1. When there is the information received, the step 607 is followed by a step S608. In the step S608, it is judged as to whether or not the received information is the image information. When the received information is the image information, the step S608 is followed by a step S609 In the step S609, the image information is delivered to the image expansion processing operation or program.

On the other hand, when the received information is not the image information, the step S608 is followed by a step S610 In the step S610, it is judged as to whether or not the received information is the sensor information. When the received information is the sensor information, "transmission information" directed to the model car 1 exists a half a delay time in communication is calculated by subtracting: a time at which the communication takes place; from the current time. The step S611 is followed by a step S612. In the step S612, the sensor information is delivered to the image processing process. Then, the step S612 is followed by a step S613. In the step S613, a communication monitoring timer is reset.

When the received information does not exist in the step S607, this step S607 is followed by a step S614. In the step S614, it is judged as to whether or not the "transmission information" directed to the model car 1 exists. When the "transmission information" directed to the model car 1 exists, the step S614 is followed by a step S615. In the step S615, such transmission information is transmitted. The step S615 is followed by a step S616. In the step S616, the communication monitoring timer is reset. In a condition in which not only any received information but also any transmission information are not found, when a timeout of the communication monitoring time occurs in a step S617 subsequent to the step S616, the system condition is changed from the "connected" condition to the "not connected" condition in a step S618 subsequent to the step S617.

Figure 16:
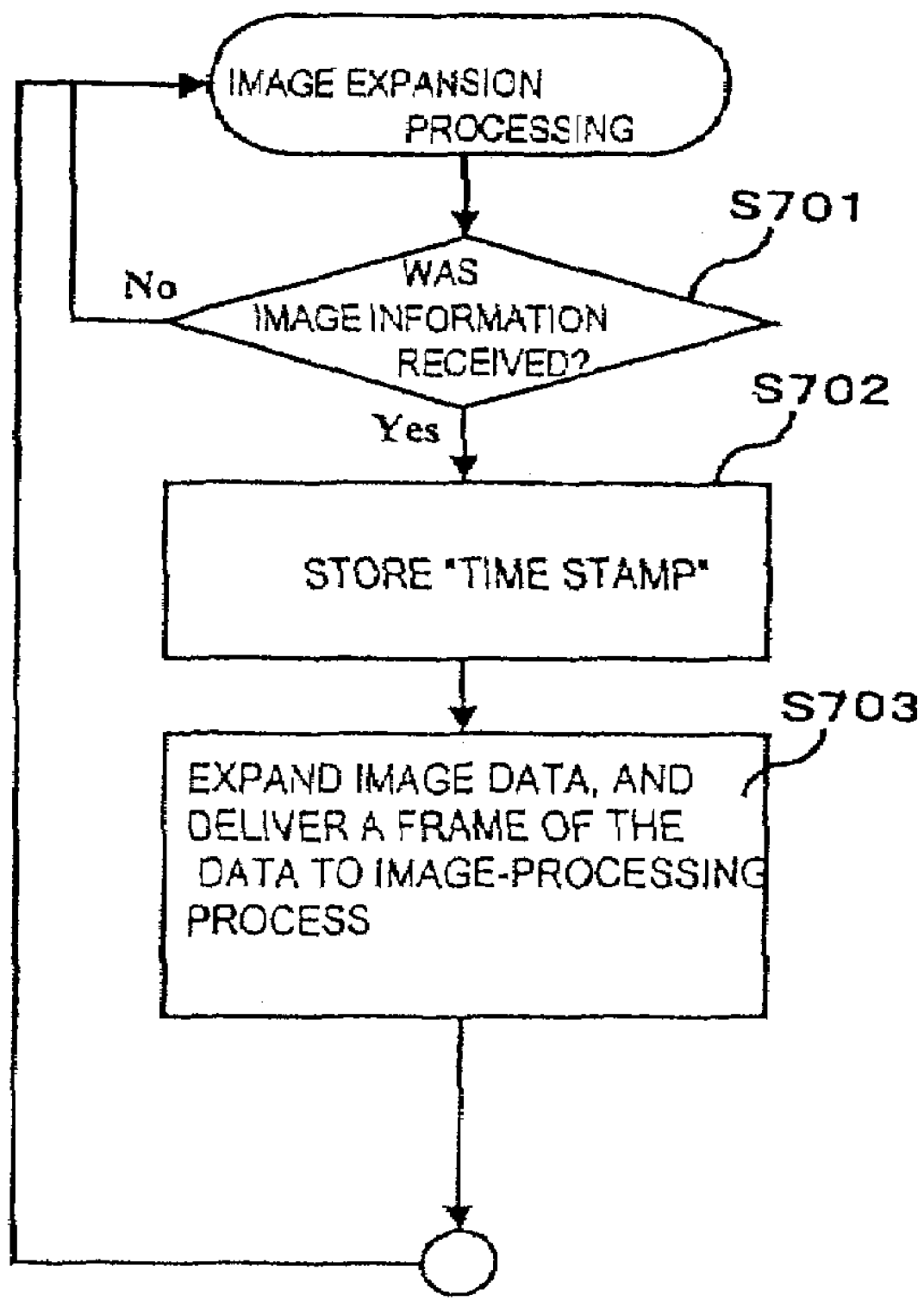
FIG. 16 is a flowchart of the image expansion processing.

The image expansion processing operation of the operation machine 2 of the present invention will now described with reference to a flowchart shown in FIG. 16. In a step S701 of the flowchart, the image expansion processing operation of the operation machine 2 waits in its normal condition till it receives the image information supplied from the model car 1. When the image information is received in the step S701, the step S701 is followed by a step S702. In the step S702, a time stamp contained in the image information is stored. After that, the step S702 is followed by a step S703. In the step S703: image data is expanded; and, a frame of image is delivered to the image processing process.

Figure 17:
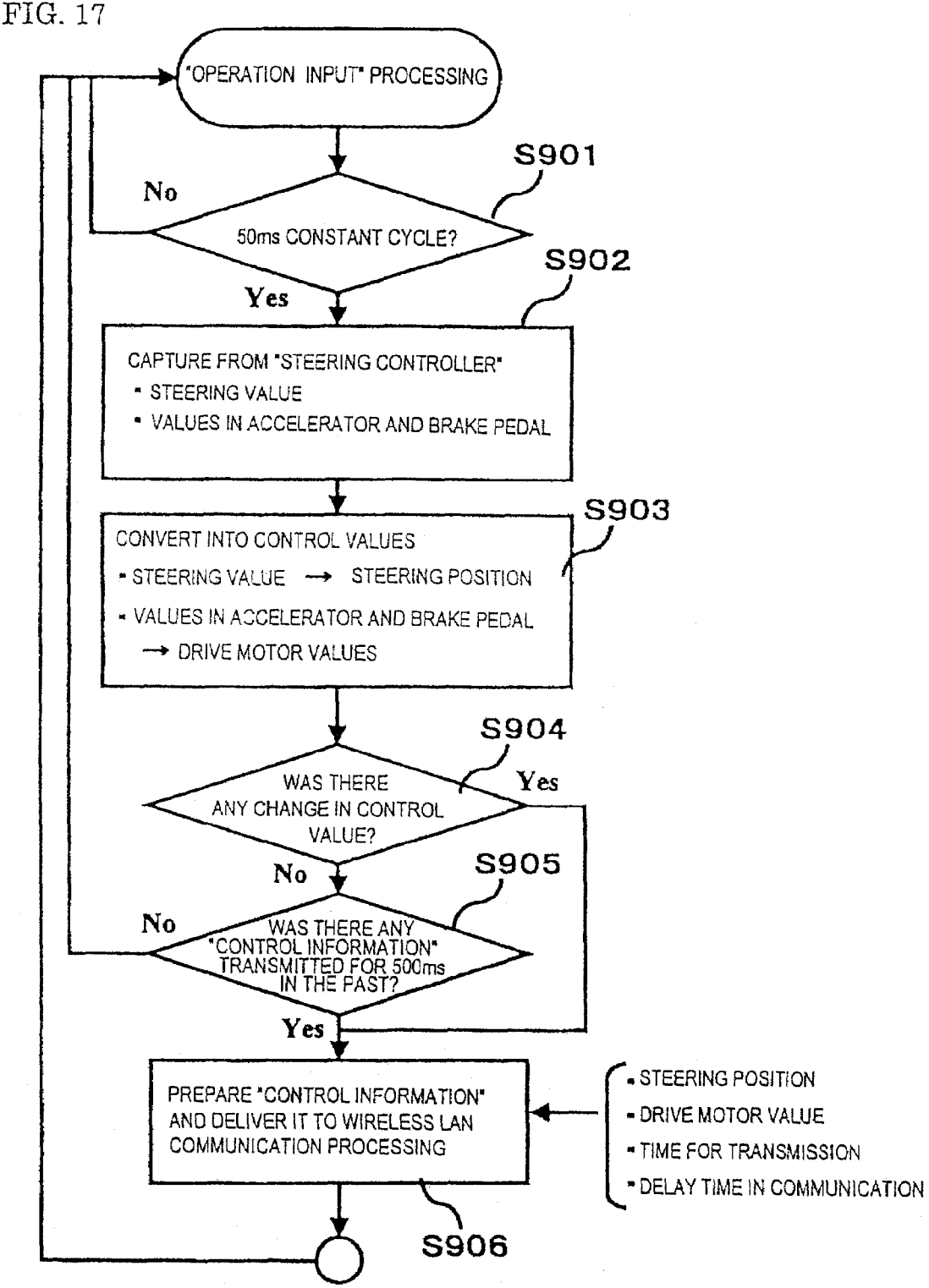
FIG. 17 is a flowchart of the operation input processing.

Next, with reference to a flowchart shown in FIG. 17, the operation input processing operation of the operation machine 2 of the present invention will be described. In a step S901 of the flowchart, it is judged as to whether or not an input from the game controller 3 is inputted at constant cycles of 50 ms. When an input from the game controller 3 is supplied at equal intervals or cycles of 50 ms, the step S901 is followed by a step S902. In the step S902, a steering value and accelerator/brake values each in an accelerator and in a brake pedal of such an input are captured from a steering controller. The step S902 is followed by a step S903. In the step S903, the steering value and the accelerator/brake values are converted into the control value such as a steering position and a drive motor value, wherein: the steering position thus converted corresponds to the steering value; a drive motor value thus converted corresponds to the accelerator/brake values; and, the control value is transmitted to the model car 1.

Figure 18:
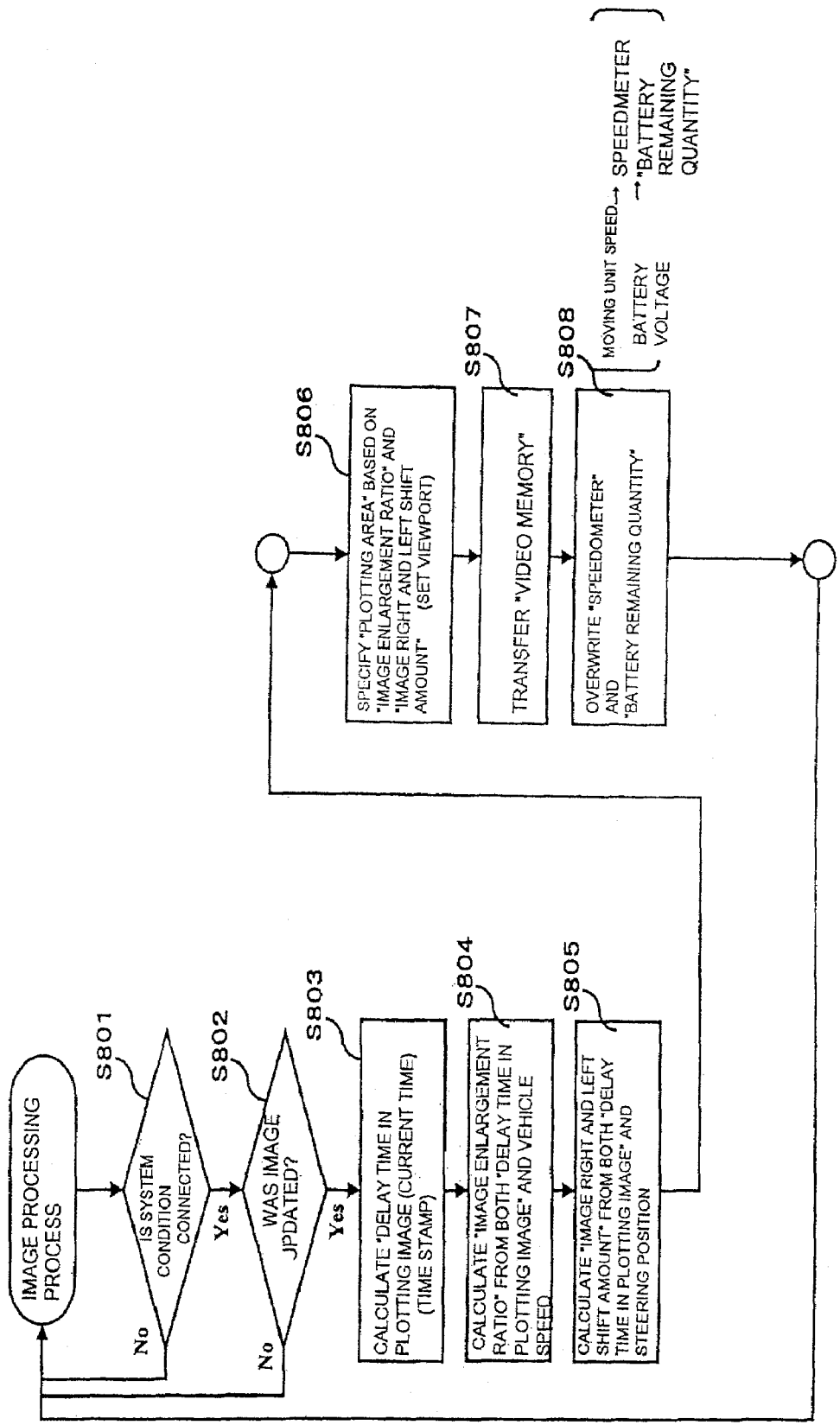
FIG. 18 is a flowchart of the image-processing process.
Figure 20:
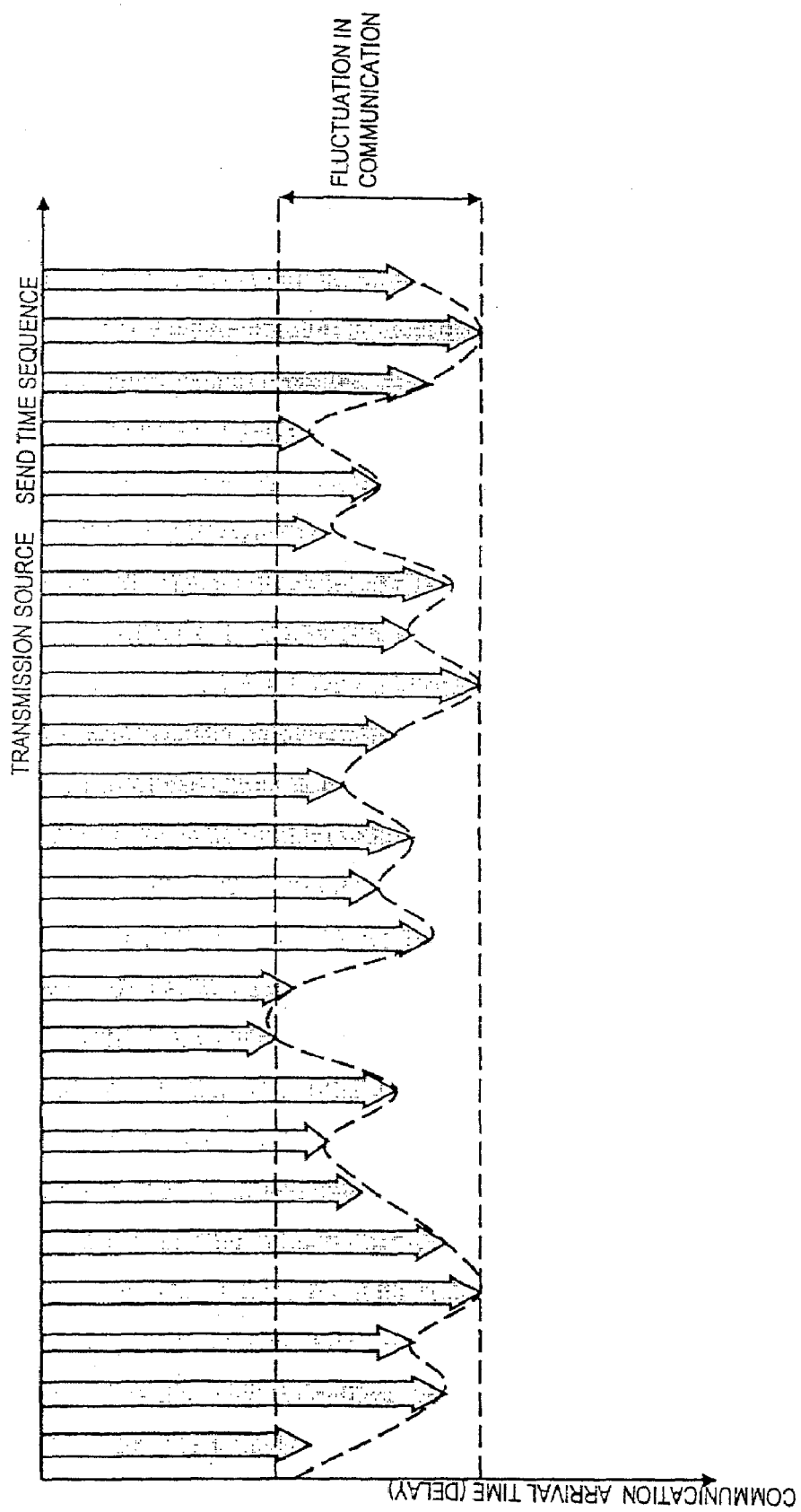
FIG. 20 is a view for explaining the fluctuation in communication.
Figure 21:
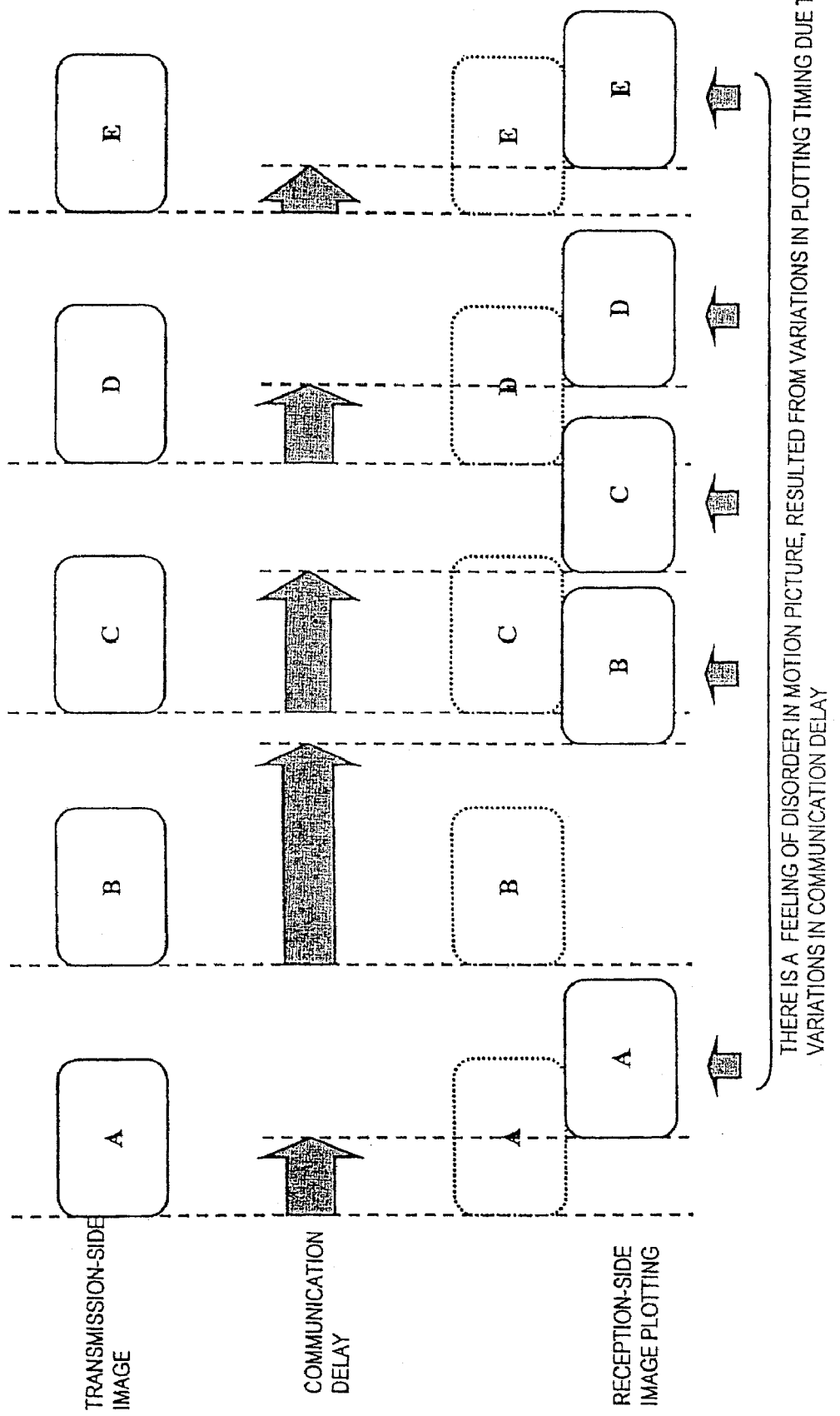
FIG. 21 is a view for explaining the influence on the frame plotting timing exerted by the fluctuation.

Now, with reference to a flowchart shown in FIG. 18, an image processing process of the operation machine 2 according to the present invention will be described. In a step S801 of the flowchart, it is judged as to whether or not the system condition is the "connected" condition. When the system condition is the "connected" condition, the step S801 is followed by a step S802. In the step S802, it judged as to whether or not the image is updated. When the image is updated, the step S802 is followed by a step S803. In the step S803, a "time delay" in plotting the image is calculated by subtracting a time stamp (which is stored in the updated image) from the current system time. After that, the step S803 is followed by a step S804. In the step S804, an "image enlargement ratio" is calculated on the basis of both the time delay in plotting the image" and the moving unit speed. Then, the step S804 is followed by a step S805. In the step S805, an "image right and left shift amount" is calculated on the basis of both the time delay in plotting the image" and the steering position.

Then, the step S805 is followed by a step S806. In the step S806, a "plotting area" is specified on the basis of both the image enlargement ratio and the image right and left shift amount. After that, the step S806 is followed by a step S807. In the step S807, a "video memory" is transferred. Then, the step S807 is followed by a step S808. In the step S808, the speedometer and the battery remaining quantity are overwritten in the image.

On the other hand, in the previous step S904, when the control value is changed, the step S904 is followed by a step S906. In the step S906, apiece of "control information" is prepared and delivered to the wireless LAN communication processing operation. Further, in the previous step S905, when any "control information" transmitted for 500 ms in the past does not exist, the step S905 is followed by the step S906. In the step 906, the "control information" is prepared and delivered to the wireless LAN communication processing operation, as already described in the above.

The communication data used in the present invention is summarized as shown in FIG. 19. More specifically, the system connection information, which is transmitted when the operation machine 2 is connected with the system, is constructed of both the authentication code and the system time, wherein: the authentication code is a code for connecting the operation machine 2 with the system; and, the system time is a time of the operation machine 2, and used in regulating the internal clock of the on-moving unit computer 11 at a time when the system is connected.

Although the most preferred embodiments of the present invention have been described in detail in the above, it is intended that all matters given in the above description and illustrated in the accompanying drawings shall be interpreted to be illustrative only and not as a limitation to the scope of the present invention. For example, although the model car 1 has been described as a moving unit in the above description, the moving unit is not limited to the model car 1 only. The moving unit comprises any other model planes, model ships, robots, robotic arms in industrial robots and various kinds of like moving units together with the model cars according to the present invention.

Further, in case that a model car is used as the moving unit, the term "deviation angle" described above means a steering angle, which lies in a horizontal plane. On the other hand, in case that a robotic arm in an industrial robot, for example, is used as the moving unit, the term "deviation angle" applied to such a robotic arm may lie in a vertical plane or in an oblique plane or in a horizontal plane. Consequently, according to the plane in which the "deviation angle" may lie, the received image in the image processing described above may be shifted in a vertical direction or in an oblique direction or in a horizontal direction.

Finally, the present application corresponds to Japanese Patent Application No. 2005-096938 filed on Mar. 30, 2005, which is herein incorporated by reference.

What is claimed is:

1. An image display method with a fluctuation correction, which method uses an operation machine to display a received image on a monitor, enabling an operator to remotely control a sensor-equipped moving unit guided by a received image which is provided through a network by a camera on the sensor-equipped moving unit and displayed on the monitor, comprising:

plotting the received image on the monitor at predetermined intervals in plotting timing, and the image thus plotted is used as a predicted image which has been subjected to a time delay processing, wherein the predicted image is a pseudo image after the elapse of a predicted period of delay time and the predicted image is obtained by subjecting a received image to image processing on the basis of sensor information obtained from the moving unit.

2. The image display method with the fluctuation correction as set forth in claim 1, wherein said predicted period of delay time is calculated by subtracting: a time stamp, which is tagged to the image information received at its reception time from a system time in plotting timing of said image.

3. The image display method with the fluctuation correction as set forth in claim 1, wherein said sensor information is a travel speed of said moving unit, a deviation angle of said moving unit, and a battery voltage value of said moving unit.

4. The image display method with the fluctuation correction as set forth in claim 3, wherein, in said image processing, said received image is zoomed and/or shifted vertically, horizontally or obliquely, on the basis of said sensor information.

5. A moving unit remote control system provided with an operation machine for remotely controlling a moving unit on the basis of image information supplied from said moving unit, the improvement wherein said operation machine comprises:

information receiving means for receiving information for plotting an image, which information comprises image information together with sensor information, wherein said image information is supplied from an on-moving unit camera of said moving unit;

image expansion means for expanding the image data contained in said information for plotting the image having been received;

image processing means for processing the thus expanded image on the basis of said sensor information having been received;

operation input means for converting an operation input value, which is inputted by a controller, into control information adapted for said moving unit; and control information transmitting means for transmitting said control information having been generated by said operation input means to said moving unit;

wherein said moving unit comprises:

image compression means for performing an image compression in which a time stamp is tagged to an image supplied from said on-moving unit camera to prepare the image information which is transmitted to said operation machine;

sensor taking-in means for taking in a travel speed of said moving unit, and a battery voltage value as the sensor information which is transmitted to the operation machine, wherein the moving unit speed is supplied from the moving unit speed sensor and the battery voltage value is supplied from the battery;

means for transmitting the information for plotting the image, wherein both the image information and the sensor information are transmitted to the operation machine as said information for plotting the image;

control information receiving means for receiving said control information supplied from said operation machine; and control processing means for controlling a servo and a motor on the basis of said control information having been received.

6. The moving unit remote control system as set forth in claim 5, wherein said image processing means adjusts an image plotting area for displaying said expanded image data on the basis of said sensor information having been received.

7. The moving unit remote control system as set forth in claim 6, wherein said image processing means: calculates a delay time in plotting the image by subtracting a time of the time stamp from a current system time, wherein the time stamp is stored in the image data having been expanded; calculates an image enlargement ratio based on both the delay time in plotting the image and a travel speed of said moving unit; calculates an amount of the image shift in a vertical direction or in a horizontal direction or in an oblique direction based on both the delay time in plotting the image and a deviated position of said moving unit; whereby the image plotting area is specified on the basis of both the image enlargement ratio and the amount of the image shift.

8. The moving unit remote control system as set forth in claim 5, wherein the sensor information comprises: a moving unit speed value supplied from the on-moving unit speed sensor mounted on the moving unit; and, the battery voltage value.

* * * * *